United States Patent
Mestanov et al.

(10) Patent No.: US 11,290,927 B2
(45) Date of Patent: *Mar. 29, 2022

(54) NETWORK-INSTRUCTED HANDOVER FROM WLAN TO ANOTHER RADIO ACCESS NETWORK

(71) Applicant: Telefonaktiebolaget LM Ericsson (publ), Stockholm (SE)

(72) Inventors: Filip Mestanov, Sollentuna (SE); Tomas Hedberg, Stockholm (SE); Stephen Rayment, Ottawa (CA); Dinand Roeland, Sollentuna (SE); Magnus Stattin, Upplands Väsby (SE); Jari Vikberg, Järna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 169 days.

This patent is subject to a terminal disclaimer.

(21) Appl. No.: 16/401,367

(22) Filed: May 2, 2019

(65) Prior Publication Data

US 2019/0261232 A1    Aug. 22, 2019

Related U.S. Application Data

(63) Continuation of application No. 15/650,616, filed on Jul. 14, 2017, now Pat. No. 10,321,364, which is a
(Continued)

(51) Int. Cl.
*H04W 36/00* (2009.01)
*H04W 36/14* (2009.01)
*H04W 36/38* (2009.01)

(52) U.S. Cl.
CPC ... *H04W 36/0066* (2013.01); *H04W 36/0022* (2013.01); *H04W 36/0061* (2013.01); *H04W 36/14* (2013.01); *H04W 36/38* (2013.01)

(58) Field of Classification Search
None
See application file for complete search history.

(56) References Cited

U.S. PATENT DOCUMENTS

| 7,260,399 B1 | 8/2007 | Oh et al. |
| 9,756,533 B2 | 9/2017 | Mestanov et al. |
| (Continued) | | |

FOREIGN PATENT DOCUMENTS

| CN | 1522001 A | 8/2004 |
| CN | 1726727 A | 1/2006 |
| (Continued) | | |

OTHER PUBLICATIONS

Fourth Office Action for Chinese Patent Application No. 201480021970.8, daed Nov. 5, 12 pages.
(Continued)

*Primary Examiner* — Kodzovi Acolatse
(74) *Attorney, Agent, or Firm* — Withrow & Terranova, PLLC

(57) ABSTRACT

Systems and methods are disclosed for providing a network-instructed handover of a wireless device from a Wireless Local Area Network (WLAN) to a Radio Access Network (RAN) of another Radio Access Technology (RAT), e.g., a 3$^{rd}$ Generation Partnership Project (3GPP) or 3$^{rd}$ Generation Partnership Project 2 (3GPP2) RAT. In one embodiment, a WLAN access node determines that a handover of a wireless device from the WLAN to another RAN of a different RAT is to be performed and transmits a handover instruction to the wireless device that instructs the wireless device to perform a handover from the WLAN to a RAN of a different RAT. In this manner, the WLAN access node is able to steer the wireless device from the WLAN to a RAN of a different RAT.

17 Claims, 17 Drawing Sheets

Related U.S. Application Data continuation of application No. 14/246,841, filed on Apr. 7, 2014, now Pat. No. 9,756,533.

(60) Provisional application No. 61/811,732, filed on Apr. 13, 2013.

(56) References Cited

U.S. PATENT DOCUMENTS

| | | | |
|---|---|---|---|
| 2004/0105434 | A1 | 6/2004 | Baw |
| 2005/0288019 | A1 | 12/2005 | Park et al. |
| 2006/0121935 | A1 | 6/2006 | Dalsgaard et al. |
| 2006/0187873 | A1* | 8/2006 | Friday .................. H04W 48/20 370/328 |
| 2007/0275723 | A1* | 11/2007 | Jeong .................. H04B 7/2681 455/436 |
| 2007/0291792 | A1* | 12/2007 | Watfa .................... H04L 69/164 370/469 |
| 2008/0014957 | A1 | 1/2008 | Ore |
| 2008/0102843 | A1* | 5/2008 | Todd ..................... H04W 36/18 455/445 |
| 2008/0123607 | A1* | 5/2008 | Jokela .................. H04L 47/824 370/338 |
| 2010/0202406 | A1* | 8/2010 | Feder ............. H04W 36/00837 370/331 |
| 2010/0226339 | A1 | 9/2010 | Stephenson et al. |
| 2010/0316021 | A1* | 12/2010 | Lerzer .................. H04W 36/02 370/331 |
| 2011/0103233 | A1 | 5/2011 | Shu et al. |
| 2011/0106959 | A1 | 5/2011 | Suciu et al. |
| 2012/0224484 | A1* | 9/2012 | Babiarz ............... H04L 43/0876 370/235 |
| 2013/0016696 | A1* | 1/2013 | Adjakple .......... H04W 72/0486 370/331 |
| 2015/0110027 | A1 | 4/2015 | Lim et al. |
| 2017/0318506 | A1 | 11/2017 | Mestanov et al. |

FOREIGN PATENT DOCUMENTS

| | | |
|---|---|---|
| CN | 101867987 A | 10/2010 |
| WO | 2008107766 A2 | 9/2008 |

OTHER PUBLICATIONS

Author Unknown, "Technical Specification Group Core Network and Terminals; Numbering, addressing and dentification (Release 11)," Technical Specification 23.003, Version 11.5.0, 3GPP Organizational Partners, Mar. 2013, 83 pages.
Author Unknown, "Technical Specification Group Services and System Aspects; General Packet Radio Service GPRS) enhancements for Evolved Universal Terrestrial Radio Access Network (E-UTRAN) access (Release 12)," Technical Specification 23.401, Version 12.4.0, 3GPP Organizational Partners, Mar. 2014, 302 pages.
Author Unknown, "Technical Specification Group Radio Access Network; Radio Resource Control (RRC) Protocol specification (Release 12)," Technical Specification 25.331, Version 12.1.0, 3GPP Organizational Partners, Mar. 2014, 2,120 pages.
Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.1.0, 3GPP Organizational Partners, Mar. 2014, 356 pages.
Author Unknown, "Technical Specification Group GSM/EDGE Radio Access Network; Mobile radio interface layer 3 specification; Radio Resource Control (RRC) protocol (Release 12)," Technical Specification 44.018, Version 12.2.0, 3GPP Organizational Partners, Mar. 2014, 467 pages.
Author Unknown, "Disassociation frame format," Chapter 8.3.3 4, IEEE Standard 802.11, Part 11: Wireless LAN Medium Access Control(MAC) and Physical Layer (PHY) Specifications, Mar. 29, 2012, IEEE, p. 423.
Author Unknown, "Association Response frame format," Chapter 8.3.3.6, IEEE Standard 802.11, Part 11 Wireless LAN Medium Access Control(MAC) and Physical Layer (PHY) Specifications, Mar. 29, 2012, IEEE, pp. 425-426.
Author Unknown, "Deauthentication," Chapter 8.3.3.12, IEEE Standard 802.11, Part 11: Wireless LAN Medium Access Control(MAC) and Physical Layer (PHY) Specifications, Mar. 29, 2012, IEEE, p. 436.
Author Unknown, "IEEE Standard for Information technology—Telecommunications and information exchange between systems, Local and metropolitan area networks—Specific requirements, Part 11: Wireless LAN Medium Access Control (MAC) and Physical Layer (PHY) Specifications," IEEE Standards Association, IEEE Std 302.11™-2012, (Revision of IEEE Std 802.11-2007), Mar. 29, 2012, The Institute of Electrical and Electronics Engineers, Inc., 2,793 pages.
Author Unknown, "Reason Code field," Chapter 8.4.1.7, IEEE Standard 802.11, Part 11: Wireless LAN Medium Access Control(MAC) and Physical Layer (PHY) Specifications, Mar. 29, 2012, IEEE, pp. 442-445.
Author Unknown, "Vendor Specific element," Chapter 8.4.2.28, IEEE Standard 802.11, Part 11: Wireless LAN Medium Access Control(MAC) and Physical Layer (PHY) Specifications, Mar. 29, 2012, IEEE, p. 562.
Author Unknown, "BSS Transition Management Request frame format," Chapter 8.5.14.9, IEEE Standard 802.11, Part 11: Wireless LAN Medium Access Control(MAC) and Physical Layer (PHY) Specifications, Mar. 29, 2012, IEEE, pp. 781-783.
Author Unknown, "WNM-Notification Request frame format," Chapter 8.5.14.28, IEEE Standard 802.11, Part 11: Wireless LAN Medium Access Control(MAC) and Physical Layer (PHY) Specifications, Mar. 29, 2012, IEEE, pp. 795-796.
Non-Final Office Action for U.S. Appl. No. 14/246,841, dated Nov. 13, 2015, 20 pages.
Final Office Action for U.S. Appl. No. 14/246,841, dated Apr. 13, 2016, 22 pages.
Advisory Action for U.S. Appl. No. 14/246,841, dated Jun. 30, 2016, 4 pages.
Advisory Action, Examiner-Initiated Interview Summary, and AFCP 2.0 Decision for U.S. Appl. No. 14/246,841, dated Jul. 29, 2016, 4 pages.
Non-Final Office Action for U.S. Appl. No. 14/246,841, dated Sep. 6, 2016, 22 pages.
Final Office Action for U.S. Appl. No. 14/246,841, dated Feb. 3, 2017, 17 pages.
Notice of Allowance, Notice Requiring Inventor's Oath or Declaration, Examiner-Initiated Interview Summary, and AFCP 2.0 Decision for U.S. Appl. No. 14/246,841, dated Apr. 27, 2017.
Patent Examination Report No. 1 for Australian Patent Application No. 2014252143, dated Feb. 25, 2016, 3 pages.
International Search Report and Written Opinion for International Patent Application No. PCT/IB2014/060653, dated Nov. 12, 2014, 15 pages.
International Preliminary Report on Patentability for International Patent Application No. PCT/IB2014/060653, dated Oct. 22, 2015, 12 pages.
Non-Final Office Action for U.S. Appl. No. 15/650,616, dated Apr. 19, 2018, 25 pages.
Final Office Action for U.S. Appl. No. 15/650,616, dated Oct. 9, 2018, 25 pages.
Advisory Action, Examiner-Initiated Interview Summary, and AFCP 2.0 Decision for U.S. Appl. No. 15/650,616, dated Dec. 26, 2018, 4 pages.
Notice of Allowance for U.S. Appl. No. 15/650,616, dated Jan. 31, 2019, 8 pages.
First Office Action for Chinese Patent Application No. 201480021970. 8, dated Feb. 24, 2018, 28 pages.
Third Office Action for Chinese Patent Application No. 201480021970. 8, dated Jun. 5, 2019, 27 pages.
Examination Report for European Patent Application No. 14723479. 3, dated Jul. 5, 2017, 6 pages.

(56) References Cited

OTHER PUBLICATIONS

Intention to Grant for European Patent Application No. 14723479.3, dated May 18, 2018, 11 pages.
Extended European Search Report for European Patent Application No. 18194444.8, dated Oct. 15, 2018, 5 pages.
Author Unknown, "Association Request frame format," Chapter 8.3.3 5, IEEE Standard 802.11, Part 11: Wireless LAN Medium Access Control (MAC) and Physical Layer (PHY) Specifications, Mar. 29, 2012, IEEE, pp. 423-424.
Extended European Search Report for European Patent Application No. 20178592.0, dated Sep. 10, 2020, 10 pages.

* cited by examiner

NETWORK-INSTRUCTED HANDOVER FROM WLAN TO ANOTHER RADIO ACCESS NETWORK

RELATED APPLICATIONS

This application is a continuation of U.S. patent application Ser. No. 15/650,616, filed Jul. 14, 2017, now U.S. Pat. No. 10,321,364, which is a continuation of U.S. patent application Ser. No. 14/246,841, filed Apr. 7, 2014, now U.S. Pat. No. 9,756,533, which claims the benefit of provisional patent application Ser. No. 61/811,732, filed Apr. 13, 2013, the disclosures of which are hereby incorporated herein by reference in their entireties.

FIELD OF THE DISCLOSURE

The present disclosure relates to a network-instructed handover of a wireless device from a Wireless Local Area Network (WLAN) to a Radio Access Network (RAN) of another Radio Access Technology (RAT), e.g., a $3^{rd}$ Generation Partnership Project (3GPP) or $3^{rd}$ Generation Partnership Project 2 (3GPP2) RAT.

BACKGROUND

The Institute for Electrical and Electronics Engineers (IEEE) has created and maintains a set of Media Access Control (MAC) and PHYsical layer (PHY) specifications for implementing Wireless Local Area Network (WLAN) communication. This set of MAC and PHY layer specifications is known as the IEEE 802.11 specifications (more specifically known as IEEE Standard for Information technology—Telecommunications and information exchange between systems Local and metropolitan area networks—Specific requirements Part 11: Wireless LAN Medium Access Control (MAC) and Physical Layer (PHY) Specifications). WLANs that operate according to the IEEE 802.11 specifications are also known as Wi-Fi® networks. Currently, Wi-Fi® networks mainly operate in the 2.4 Gigahertz (GHz) or the 5 GHz frequency band.

The IEEE 802.11 specifications regulate the MAC layer, the PHY layer, and other aspects of each addressable unit, which is referred to as a station (STA) (e.g., an access point or a wireless device), to secure compatibility and inter-operability between access points and wireless devices. Wireless devices may also be referred to herein as wireless terminals, portable devices, or portable terminals. Wi-Fi® networks are generally operated in unlicensed bands. As such, communication over a Wi-Fi® network may be subject to interference from any number of both known and unknown devices. Wi-Fi® networks are commonly used as wireless extensions to fixed/wired broadband access, e.g., in domestic environments and hotspots such as, for example, airports, train stations, and restaurants.

Recently, Wi-Fi® networks have been subject to increased interest from cellular network operators. In particular, there has been an increased interest in using Wi-Fi® networks as an extension of or as an alternative to cellular Radio Access Networks (RANs) to handle the always increasing wireless bandwidth demands. Cellular network operators that are currently serving mobile devices with, e.g. any of the $3^{rd}$ Generation Partnership Project (3GPP) technologies, see Wi-Fi® networks as a wireless technology that can provide improved service in their regular cellular networks. The 3GPP technologies include Long Term Evolution (LTE), Universal Mobile Telecommunications System (UMTS)/Wideband Code Division Multiple Access (WCDMA), and Global System for Mobile Communications (GSM).

The term "operator-controlled Wi-Fi®" refers to a Wi-Fi® deployment that on some level is integrated with a cellular network operator's existing network and where the 3GPP RAN and the Wi-Fi® wireless access may even be connected to the same core network and provide the same services. There is currently quite intense activity in the area of operator-controlled Wi-Fi® in several standardization organizations. In 3GPP, connection of Wi-Fi® access points to the 3GPP-specified core network is being pursued. In the Wi-Fi® Alliance (WFA), activities related to certification of Wi-Fi® products are undertaken, which are to some extent driven by the need to make Wi-Fi® networks a viable wireless technology for cellular operators to support high bandwidth offerings in their networks. In this regard, the term "Wi-Fi® offload" is commonly used to refer to a cellular network operator's ability to offload traffic from their cellular networks to Wi-Fi® networks, e.g., in peak traffic hours and in situations when the cellular network for one reason or another needs to be offloaded, e.g., to provide requested quality of service, maximize bandwidth, or simply for coverage.

For a cellular network operator, offering a mix of both Wi-Fi® and cellular (e.g., 3GPP) Radio Access Technologies (RATs) results in new problems. In particular, some of these problems arise from the fact that Wi-Fi® networks and cellular networks (e.g., 3GPP networks) are standardized in isolation from one another. As a result, there is a need for intelligent mechanisms that enable co-existence of the Wi-Fi® and cellular network technologies. One such area is connection management. Further, wireless devices (e.g., LTE User Equipment devices (UEs)) usually support both Wi-Fi® and a number of 3GPP cellular technologies. However, many of these wireless devices are basically behaving as two separate devices from a radio access perspective. The 3GPP RAN and the modems and protocols that are operating pursuant to the 3GPP specifications are basically unaware of the Wi-Fi® protocols and modems that are operating pursuant to the IEEE 802.11 specifications.

In light of the discussion above, there is a need for systems and methods that provide intelligent connection management in a communication system having a mix of both Wi-Fi® and cellular (e.g., 3GPP) RATs.

SUMMARY

Systems and methods relating to a network-instructed handover of a wireless device from a Wireless Local Area Network (WLAN) to a Radio Access Network (RAN) of another Radio Access Technology (RAT), e.g., a $3^{rd}$ Generation Partnership Project (3GPP) or $3^{rd}$ Generation Partnership Project 2 (3GPP2) RAT, are disclosed. In one embodiment, a method of operation of a WLAN access node is provided. In one embodiment, the method of operation of the WLAN access node includes determining that a handover of a wireless device from the WLAN to another RAN of a different RAT is to be performed and transmitting a handover instruction to the wireless device that instructs the wireless device to perform a handover from the WLAN to a RAN of a different RAT. In this manner, the WLAN access node is able to steer the wireless device from the WLAN to a RAN of a different RAT.

In one embodiment, the handover is a selective handover. More specifically, in one embodiment, the handover is a handover of at least one but less than all communications sessions (e.g., Internet Protocol (IP) sessions) of the wireless device from the WLAN to a RAN of a different RAT. In another embodiment, the handover is a full handover. More specifically, in one embodiment, the handover is a handover of all communications sessions (e.g., IP sessions) of the wireless device from the WLAN to a RAN of a different RAT.

In one embodiment, the handover instruction is a general instruction to perform a handover from the WLAN to a RAN of a different RAT. In another embodiment, the handover instruction includes information that identifies the different RAT for the handover.

In yet another embodiment, the handover instruction includes information that identifies a target cell in the RAN of the different RAT. In addition, in one embodiment, the handover instruction further includes information that identifies the different RAT and the RAN of the different RAT. In another embodiment, the handover instruction further includes assistance information that assists the wireless device when performing the handover. In one embodiment, the assistance information includes at least some system information of the target cell.

In one embodiment, the different RAT is a 3GPP RAT, and the handover instruction includes one or more parameters that enable the wireless device to connect to a RAN of the 3GPP RAT.

In one embodiment, the handover instruction includes a retry timer value that defines an amount of time that the wireless device should attempt to access the RAN of the different RAT when performing the handover.

In one embodiment, the WLAN is an Institute for Electrical and Electronics Engineers (IEEE) 802.11 wireless network. Still further, in one embodiment, the different RAT is a cellular network RAT. In one embodiment, the cellular network RAT is a 3GPP or 3GPP2 RAT. Further, in one embodiment, transmitting the handover instruction to the wireless device includes transmitting, to the wireless device, a management frame selected from a group consisting of: a Deauthentication Management frame including a reason code that corresponds to the handover instruction and a Disassociation Management frame including a reason code that corresponds to the handover instruction. Still further, in one embodiment, transmitting the management frame further includes transmitting information regarding the handover instruction in one or more vendor-specific elements within the management frame. In one embodiment, the information regarding the handover instruction includes at least one of a group consisting of: a target set of networks for the handover, a target RAT for the handover, a target cell, assistance information that assists the wireless device when performing the handover, and a 3GPP handover command. Notably, a 3GPP handover command may alternatively be referred to herein as a 3GPP handover command message. In another embodiment, the information regarding the handover instruction includes a retry timer value that defines an amount of time that the wireless device should attempt to access the RAN of the 3GPP or 3GPP2 RAT when performing the handover.

In one embodiment, the WLAN is an IEEE 802.11 wireless network, the different RAT is a 3GPP or 3GPP2 cellular network RAT, and transmitting the handover instruction to the wireless device includes transmitting, to the wireless device, an Association Response Management frame including the handover instruction. In another embodiment, the WLAN is an IEEE 802.11 wireless network, the different RAT is a 3GPP or 3GPP2 cellular network RAT, and transmitting the handover instruction to the wireless device comprises transmitting, to the wireless device, a Basic Service Set (BSS) Transition Management frame with zero neighbor report elements. In one embodiment, transmitting the BSS Transition Management frame further includes transmitting information regarding the handover instruction in one or more vendor-specific elements within the BSS Transition Management frame. In one embodiment, the information regarding the handover instruction includes at least one of a group consisting of: a target set of networks for the handover, a target RAT for the handover, a target cell, assistance information that assists the wireless device when performing the handover, and a 3GPP handover command. In another embodiment, the information regarding the handover instruction includes a retry timer value that defines an amount of time that the wireless device should attempt to access the RAN of the 3GPP or 3GPP2 RAT when performing the handover.

In one embodiment, the WLAN is an IEEE 802.11 wireless network, the different RAT is a 3GPP or 3GPP2 cellular network RAT, and transmitting the handover instruction to the wireless device includes transmitting, to the wireless device, a Wireless Network Management Notification (WNM-Notification) Request frame including the handover instruction within one or more optional subelements formatted as one or more vendor-specific elements. In one embodiment, the handover instruction includes at least one of a group consisting of: information indicative of the 3GPP or 3GPP2 RAT for the handover, a cell identifier of a target cell in the RAN of the 3GPP or 3GPP2 RAT to which the wireless device is to be handed over, and one or more attachment parameters that indicate which communication sessions of the wireless device are to be handed over.

In one embodiment, the WLAN is an IEEE 802.11 wireless network, the different RAT is a 3GPP or 3GPP2 cellular network RAT, and transmitting the handover instruction to the wireless device includes transmitting, to the wireless device, a WNM-Notification Request frame including the handover instruction.

In one embodiment, determining that a handover of the wireless device from the WLAN to another RAN of a different RAT is to be performed includes deciding to initiate a handover to a 3GPP RAT, sending a handover preparation request to a RAN in a RAN of the 3GPP RAT, and receiving a handover preparation response from the RAN comprising a 3GPP handover command. In this embodiment, transmitting the handover instruction includes transmitting the 3GPP handover command to the wireless device. Further, in one embodiment, transmitting the 3GPP handover command includes transmitting a frame selected from a group consisting of: a Deauthorization Management frame including the 3GPP handover command, a Disassociation Management frame including the 3GPP handover command, an Association Response Management frame including the 3GPP handover command, a BSS Transition Management frame including the 3GPP handover command, and a WNM-Notification frame (e.g., a WMN-Notification Request frame) including the 3GPP handover command.

In one embodiment, a WLAN access node includes a processor and memory containing instructions executable by the processor whereby the WLAN access node is operative to determine that a handover of a wireless device from a WLAN to another RAN of a different RAT is to be performed, and transmit a handover instruction to the wireless device that instructs the wireless device to perform a handover from the WLAN to a RAN of a different RAT. The memory may include additional instructions executable by the processor whereby the WLAN access node is operative to, e.g., perform any of the embodiments described above.

In another embodiment, a WLAN access node is adapted to determine that a handover of a wireless device from the WLAN to another RAN of a different RAT is to be performed and transmit a handover instruction to the wireless device that instructs the wireless device to perform a handover from the WLAN to a RAN of a different RAT. The WLAN access node may be further adapted to perform any of the methods described above.

In another embodiment, a WLAN access node includes means for determining that a handover of a wireless device from the WLAN to another RAN of a different RAT is to be performed and means for transmitting a handover instruction to the wireless device that instructs the wireless device to perform a handover from the WLAN to a RAN of a different RAT.

In yet another embodiment, a WLAN access node includes a WLAN communication module configured to provide WLAN communication with a wireless device, a handover decision module configured to determine that a handover of the wireless device from a WLAN to another RAN of a different RAT is to be performed, and a handover instruction module configured to transmit a handover instruction to the wireless device that instructs the wireless device to perform a handover from the WLAN to a RAN of a different RAT.

In another embodiment, a computer program is provided that includes instructions which, when executed on at least one processor, cause the at least one processor to carry out any of the methods of operation of a WLAN access node described above. In one embodiment, a carrier containing the computer program is provided, wherein the carrier is one of an electronic signal, an optical signal, a radio signal, or a computer readable storage medium (e.g., a non-transitory computer readable medium).

In one embodiment, a method of operation of a wireless device is provided. The method of operation of the wireless device includes communicating with a WLAN access node, receiving a handover instruction from the WLAN access node to perform a handover from a WLAN to another RAN of a different RAT, and performing the handover in response to receiving the handover instruction.

In one embodiment, the handover instruction is an instruction for a selective handover from the WLAN to another RAN of a different RAT, and performing the handover comprises performing the selective handover. In another embodiment, the handover instruction is an instruction for a full handover from the WLAN to another RAN of a different RAT, and performing the handover comprises performing the full handover.

In one embodiment, the handover instruction is a general instruction to perform a handover to a RAN of a different RAT, and performing the handover includes performing the handover to a RAN of a different RAT. In another embodiment, the handover instruction includes information that identifies the different RAT for the handover, and performing the handover includes performing the handover to a RAN of the different RAT identified by the information included in the handover instruction.

In yet another embodiment, the handover instruction includes information that identifies a target cell in the RAN of the different RAT, and performing the handover includes performing the handover to the target cell. In one embodiment, the handover instruction further includes information that identifies the different RAT and the RAN of the different RAT. In another embodiment, the handover instruction further includes assistance information that assists the wireless device when performing the handover, and performing the handover to the target cell includes performing the handover to the target cell based on the assistance information. In one embodiment, the assistance information includes at least some system information of the target cell.

In one embodiment, the different RAT is a 3GPP RAT, and the handover instruction includes one or more parameters that enable the wireless device to connect to a RAN of the 3GPP RAT.

In one embodiment, the handover instruction includes a retry timer value that defines an amount of time that the wireless device should attempt to access the RAN of the different RAT when performing the handover. Further, in one embodiment, performing the handover includes retrying the handover for the amount of time defined by the retry timer value, and notifying the WLAN access node of a handover failure if the handover is not successful within the amount of time defined by the retry timer.

In one embodiment, the WLAN is an IEEE 802.11 wireless network. Further, in one embodiment, the different RAT is a cellular network RAT. In one embodiment, the cellular network RAT is a 3GPP or 3GPP2 RAT. Further, in one embodiment, receiving the handover instruction includes receiving a management frame transmitted by the WLAN access node, wherein the management frame is selected from a group consisting of: a Deauthentication Management frame including a reason code that corresponds to the handover instruction and a Disassociation Management frame including a reason code that corresponds to the handover instruction. In another embodiment, receiving the handover instruction includes receiving an Association Response Management frame including the handover instruction from the WLAN access node. In yet another embodiment, receiving the handover instruction includes receiving a BSS Transition Management frame with zero neighbor report elements from the WLAN access node. In yet another embodiment, receiving the handover instruction includes receiving, from the WLAN access node, a WNM-Notification frame (e.g., a WNM-Notification Request frame) including the handover instruction within one or more optional subelements formatted as one or more vendor-specific elements. In yet another embodiment, receiving the handover instruction includes receiving a WNM-Notification frame including the handover instruction from the WLAN access node.

In one embodiment, receiving the handover instruction includes receiving a 3GPP handover command within a WLAN frame.

In one embodiment, a wireless device is provided. In one embodiment, the wireless device includes a transceiver, a processor, and memory containing instructions executable by the processor whereby the wireless device is operative to communicate with a WLAN access node of a WLAN via the transceiver, receive, via the transceiver, a handover instruction from the WLAN access node to perform a handover from the WLAN to another RAN of a different RAT, and perform the handover in response to receiving the handover instruction.

In another embodiment, the wireless device is adapted to communicate with a WLAN access node of a WLAN, receive a handover instruction from the WLAN access node to perform a handover from the WLAN to another RAN of a different RAT, and perform the handover in response to receiving the handover instruction. The wireless device may be further adapted to perform any of the embodiments of the method of operation of the wireless device described above.

In another embodiment, the wireless device includes means for communicating with a WLAN access node of a WLAN, means for receiving a handover instruction from the WLAN access node to perform a handover from the WLAN to another RAN of a different RAT, and means for performing the handover in response to receiving the handover instruction.

In another embodiment, the wireless device includes a WLAN communication module configured to provide WLAN communication with a WLAN access node of a WLAN, a handover instruction reception module configured to receive a handover instruction from the WLAN access node to perform a handover from the WLAN to another RAN of a different RAT, and a handover module configured to perform the handover in response to the handover instruction.

In one embodiment, a computer program is provided. The computer program comprises instructions which, when executed on at least one processor, cause the at least one processor to carry out the method of operation of a wireless device according to any of the embodiments described above. In one embodiment, a carrier containing the computer program is provided, wherein the carrier is one of an electronic signal, an optical signal, a radio signal, or a computer readable storage medium (e.g., a non-transitory computer readable medium).

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
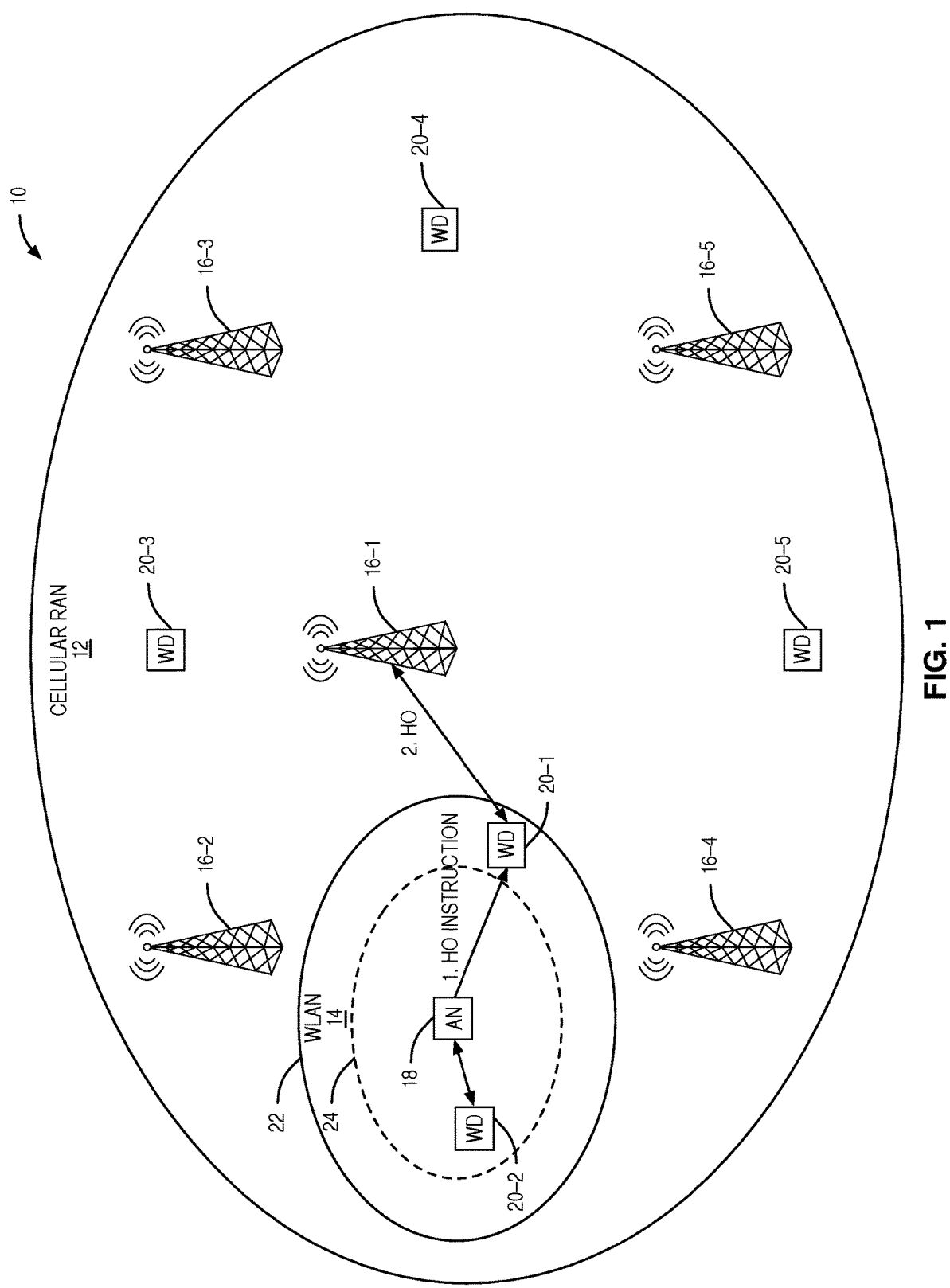
FIG. 1 illustrates a communication system including a mix of both a cellular network and a Wireless Local Area Network (WLAN) that provides a network-instructed handover of a wireless device from the WLAN to the cellular network according to one embodiment of the present disclosure.

Systems and methods relating to a network-instructed handover of a wireless device from a Wireless Local Area Network (WLAN) to a Radio Access Network (RAN) of another Radio Access Technology (RAT), e.g., a $3^{rd}$ Generation Partnership Project (3GPP) or $3^{rd}$ Generation Partnership Project 2 (3GPP2) RAT, are disclosed. In this regard, FIG. 1 illustrates a communication system 10 that includes a cellular RAN 12 and a WLAN 14. The cellular RAN 12 includes base stations 16-1 through 16-5 (generally referred to herein collectively as base stations 16 and individually as base station 16) that operate according to a cellular RAT such as, e.g., a 3GPP or 3GPP2 RAT. Some examples of 3GPP and 3GPP2 RATs are Long Term Evolution (LTE), Universal Mobile Telecommunications System (UMTS)/ Wideband Code Division Multiple Access (WCDMA), and Global System for Mobile Communications (GSM) RATs. While five base stations 16 are shown in this example, the cellular RAN 12 may include any number of base stations 16.

The WLAN 14 includes a WLAN access node 18 that operates according to a WLAN RAT and provides a connection point for the WLAN 14. The WLAN access node 18 may alternatively be referred to as an access point, a wireless access controller, or the like. In the embodiments described herein, the WLAN RAT is an Institute for Electrical and Electronics Engineers (IEEE) 802.11 WLAN RAT (i.e., the WLAN 14 is an IEEE 802.11 or Wi-Fi® network). For example, the WLAN 14 may be a Wi-Fi® hotspot. However, the present disclosure is not limited thereto. Other WLAN RATs may be used. In one embodiment, the WLAN 14 is an operator controlled WLAN, which at some level is integrated with the cellular network (including the cellular RAN 12) of a cellular network operator. Further, while not illustrated, the WLAN 14 and the cellular RAN 12 may be connected to the same core network (e.g., an Evolved Packet Core (EPC) network for a LTE RAN).

Together, the cellular RAN 12 and the WLAN 14 provide services to a number of wireless devices 20-1 through 20-5 (generally referred to herein collectively as wireless devices 20 and individually as wireless device 20). While five wireless devices 20 are shown in this example, there may be any number of wireless devices 20 served by the cellular RAN 12 and the WLAN 14. In this example, the wireless devices 20-1 and 20-2 are connected to the WLAN 14, whereas the wireless devices 20-3 through 20-5 are connected to the cellular RAN 12. The wireless devices 20, which may also be referred to as wireless communication devices, may represent any suitable type of device capable of wireless communication including, but not limited to, conventional User Equipment devices (UEs) and other types of cellular telephones; Machine Type Communication (MTC)/Machine-to-Machine (M2M) devices (e.g., wireless sensors or meters); Radio Frequency Identifiers (RFIDs); WLAN terminals or Stations (STAs); and wireless-capable laptops, tablets, and other computers.

As discussed below, the WLAN access node 18 initiates a network-instructed handover of the wireless device 20-1 from the WLAN 14 to the cellular RAN 12. Using conventional technology, the wireless device 20-1 would remain connected to the WLAN 14 until a connection with the WLAN 14 is no longer possible. In particular, the wireless device 20-1 would remain connected to the WLAN 14 as long as the wireless device 20-1 is within a coverage area 22 of the WLAN 14. As a result, the wireless device 20-1 would, at least in some scenarios, remain connected to the WLAN 14 even though a connection to the cellular RAN 12 would be better (e.g., provide lower latency, higher data rates, or the like). According to one embodiment of the present disclosure, the WLAN access node 18 operates to initiate a handover of the wireless device 20-1 from the WLAN 14 to the cellular RAN 12 whenever such a handover is desirable. As one example, the WLAN access node 18 may initiate a handover from the WLAN 14 to the cellular RAN 12 when the wireless device 20-1 is greater than a predefined radio distance from the WLAN access node 18 as indicated by dashed line 24 but is still within the coverage area 22 of the WLAN 14. As used herein, radio distance is any value indicative of a quality or strength of a radio signal received by the wireless device 20-1 from the WLAN access node 18 or received by the WLAN access node 18 from the wireless device 20-1 (e.g., a Received Signal Strength Indicator (RSSI)).

As discussed below in detail, in order to initiate the handover of the wireless device 20-1 from the WLAN 14 to the cellular RAN 12, the WLAN access node 18 sends a handover (HO) instruction to the wireless device 20-1. The handover instruction may be for a full handover of all communication sessions (e.g., Internet Protocol (IP) sessions) from the WLAN 14 to the cellular RAN 12 or a selective handover of one or more communications sessions, but potentially less than all communications sessions, from the WLAN 14 to the cellular RAN 12. In response to the handover instruction, the wireless device 20-1 performs the handover by connecting to the cellular RAN 12. In this particular example, the wireless device 20-1 connects to the base station 16-1 (more specifically to a cell served by the base station 16-1). From that point, the handed over communication session(s) are with the cellular RAN 12. Note that while the embodiment of FIG. 1 and many of the other embodiments described below focus on a handover from the WLAN 14 to the cellular RAN 12, the present disclosure is not limited thereto. The handover may be from the WLAN 14 to any RAN of a different RAT.

Figure 2:
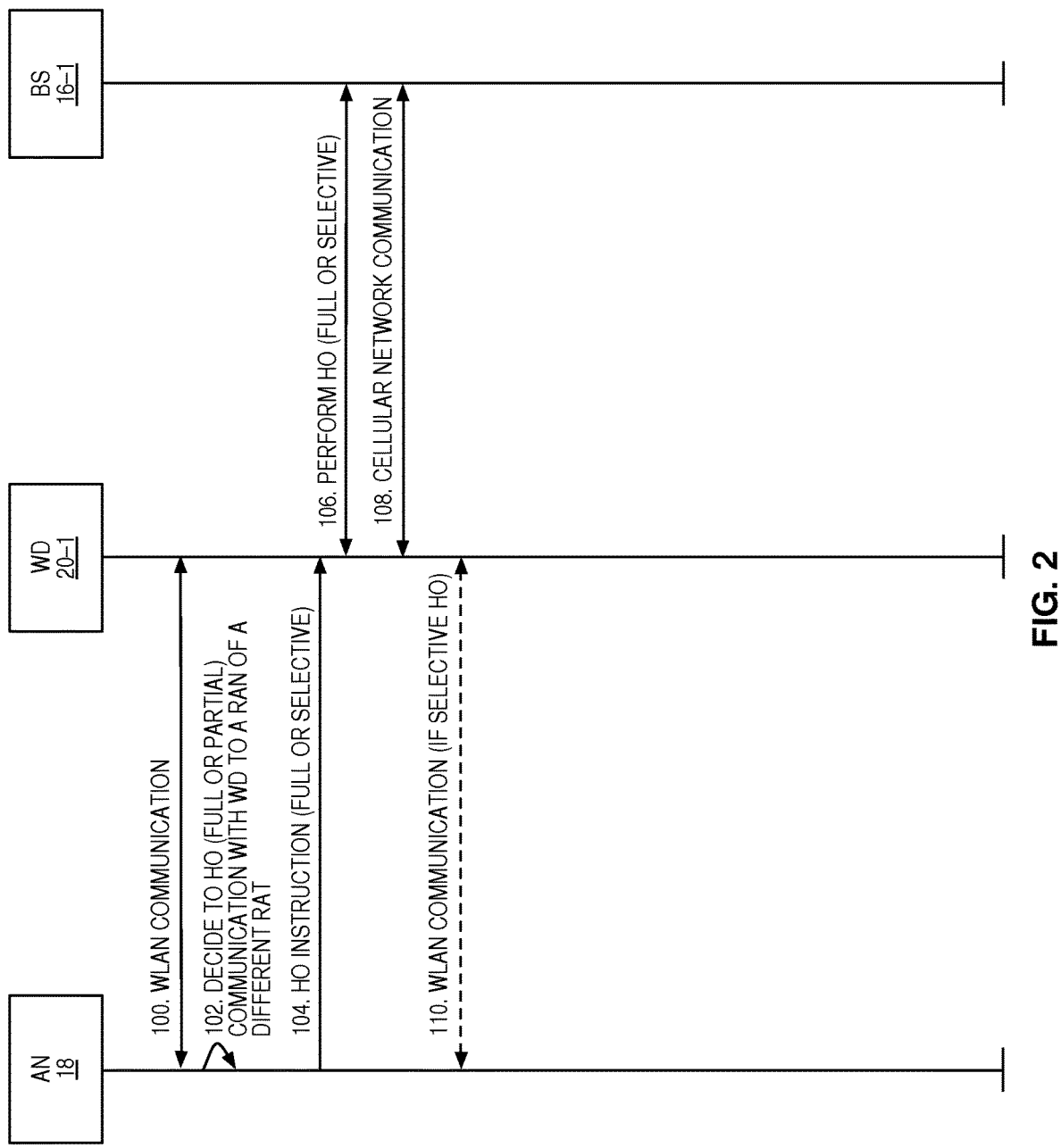
FIG. 2 illustrates the operation of the communication system of FIG. 1 to perform a network-instructed handover of the wireless device from the WLAN to the cellular network according to one embodiment of the present disclosure.

FIG. 2 illustrates the operation of the communication system 10 of FIG. 1 to perform a network-instructed handover of the wireless device 20-1 from the WLAN 14 to the cellular RAN 12 according to one embodiment of the present disclosure. As illustrated, initially, communication is established between the wireless device 20-1 and the WLAN 14 via the WLAN access node 18 (step 100). At some point, the WLAN access node 18 decides, or determines, that a handover of the wireless device 20-1 from the WLAN 14 to a RAN of a different RAT is desired (step 102). In one embodiment, the handover is a full handover of all communication or traffic (e.g., all IP sessions). In another embodiment, the handover is a selective handover of particular communication or traffic (e.g., only IP sessions of certain types). Further, the decision to perform the handover may be a general decision to perform a handover from the WLAN 14. In other words, the handover decision may be a general decision to perform a handover, where it is left to the wireless device 20-1 to determine a target for the handover. Alternatively, the handover decision may be a specific handover decision. More specifically, a specific handover decision may be a decision to perform a handover to a target RAT (e.g., LTE), a decision to perform a handover to a target RAN of a target RAT type (e.g., a specific LTE RAN), or a decision to perform a handover to a target cell in a target RAN of a target RAT type (e.g., a specific cell in a specific LTE RAN).

Next, the WLAN access node 18 transmits a handover instruction to the wireless device 20-1 (step 104). As discussed below in detail, in one embodiment, the WLAN 14 is an IEEE 802.11, or Wi-Fi®, network, and the handover instruction is transmitted within an IEEE 802.11 frame. The IEEE 802.11 frame may be, for example, a Deauthentication Management frame, a Disassociation Management frame, an Association Response Management frame, a Basic Service Set (BSS) Transition Management Request Action frame, or a Wireless Network Management Notification (WNM-Notification) frame (e.g., a WNM-Notification Request frame). The handover instruction includes information indicating that a handover is to be performed. More specifically, in one embodiment, the handover instruction includes one or more of the following:

a code (e.g., a special status code or a special reason code) that indicates that a handover is to be performed, information that indicates whether the handover is a full or a selective handover, information identifying communications sessions to be handed over in the case of selective handover (e.g., one or more 3GPP Non-Access Stratum (NAS) parameters indicating a subset of ongoing traffic or communications sessions (e.g., Packet Data Network (PDN) connections identified by Access Point Names (APNs), IP sessions identified by Traffic Flow Templates (TFTs)) that are to be handed over), information that identifies a target RAT for the handover, information that identifies a target RAN for the handover, information that identifies a target cell for the handover, assistance information that will assist the wireless device 20-1 when performing the handover (e.g., at least some System Information (SI) of a target cell), a 3GPP handover command, which may be received by the WLAN access node 18 from, e.g., the base station 16 of a target cell for the handover, or one or more parameters from a 3GPP handover command, one or more 3GPP NAS parameters (e.g. attachment type, APN, etc.), and a retry timer that defines an amount of time that the wireless device 20-1 should attempt to access a RAN of a different RAT (which, as discussed above, may or may not be specified by the handover instruction) when performing the handover before, e.g., notifying the WLAN access node 18 of a handover failure or attempting to reestablish the handed over communication with the WLAN 14.

In response to the handover instruction, the wireless device 20-1 performs the handover to, in this example, a cell served by the base station 16-1 in the cellular RAN 12 (step 106). The manner in which the wireless device 20-1 performs the handover may vary depending on the particular implementation. As one example, the wireless device 20-1 synchronizes to the cell served by the base station 16-1, obtains the system information of the cell (if needed), and initiates a random access procedure to establish a connection to the cell served by the base station 16-1. Once the random access procedure is finished, the final steps of the handover are completed. However, the exact details depend on the RAT of the cellular RAN 12 and the particular implementation (e.g., whether assistance information is provided in the handover instruction). Once the handover is complete, the wireless device 20-1 communicates with the base station 16-1 (step 108). In addition, if the handover was a selective handover, the wireless device 20-1 also communicates with the WLAN access node 18 for any communications session(s) or traffic that was not handed over (step 110).

Figure 3:
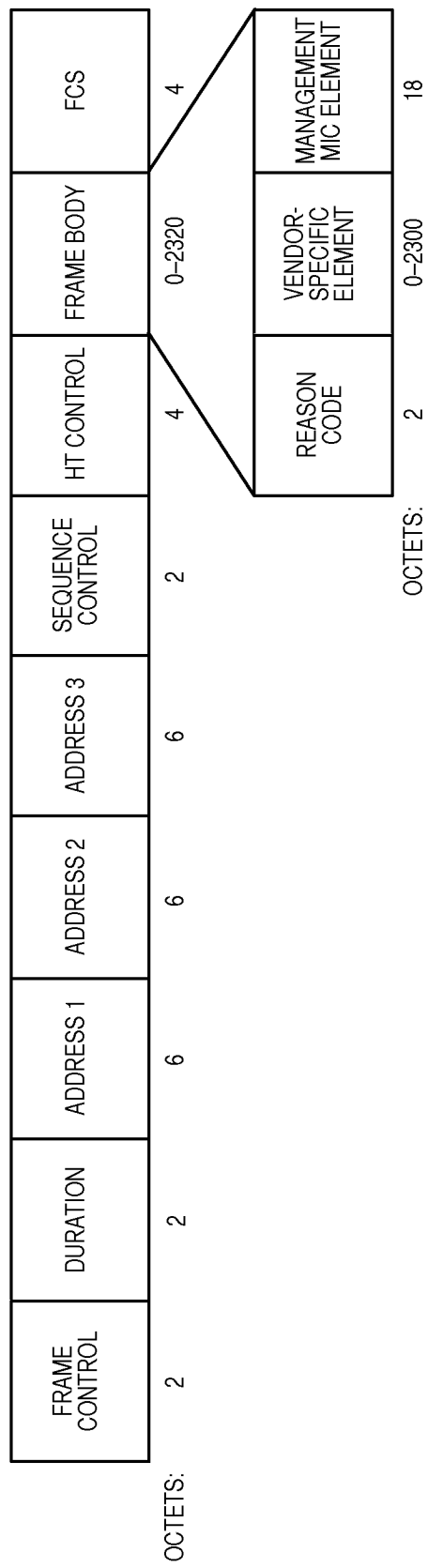
FIG. 3 illustrates a frame structure of an Institute for Electrical and Electronics Engineers (IEEE) 802.11 Deauthentication Management frame or an IEEE 802.11 Disassociation Management frame that is utilized to transmit a handover instruction from a WLAN access node to the wireless device according to one embodiment of the present disclosure.

As discussed above, in some embodiments, the handover instruction is transmitted from the WLAN access node 18 to the wireless device 20-1 within a particular type of IEEE 802.11, or Wi-Fi®, frame. In this regard, FIG. 3 illustrates a frame format for both an IEEE 802.11 Deauthentication Management frame and an IEEE 802.11 Disassociation Management frame that can be utilized to transmit the handover instruction according to one embodiment of the present disclosure. These two frames have the same frame format. Notably, the frame format of the Deauthentication Management frame and the Disassociation Management frame are defined in Chapters 8.3.3.12 and 8.3.3.4 of "802.11-2012—IEEE Standard for Information technology—Telecommunications and information exchange between systems Local and metropolitan area networks—Specific requirements Part 11: Wireless LAN Medium Access Control (MAC) and Physical Layer (PHY) Specifications," which is referred to herein as the IEEE 802.11-2012 specification.

Importantly, the frame body of the Deauthentication/Disassociation frame includes a reason code and one or more vendor-specific elements. In one embodiment, the handover instruction includes a special reason code transmitted in the frame body. In particular, the IEEE 802.11-2012 specification defines a number of reason codes in Chapter 8.4.1.7. In this embodiment, a new reason code is defined for a handover instruction from the WLAN 14. Thus, in this embodiment, the WLAN access node 18 transmits the handover instruction by transmitting a Deauthentication/Disassociation Management frame including the new, or special, reason code defined to indicate a handover instruction.

In addition, in some embodiments, the handover instruction includes additional information transmitted in the one or more vendor-specific elements of the Deauthentication/Disassociation Management frame. This additional information may include any information related to the handover of the wireless device 20-1 from the WLAN 14 to, in the example of FIGS. 1 and 2, the cellular RAN 12. In one embodiment, the additional information includes one or more of the following:

A target set of networks (e.g., Public Land Mobile Networks (PLMNs) or Network Identifier/System Identifiers (NID/SIDs)) for the handover. The WLAN 14 may belong to a separate network compared to the cellular RAN 12. Furthermore, different equivalent PLMNs may exist in the cellular/3GPP domain.

A target 3GPP/3GPP2 RAT for the handover (i.e., the 3GPP/3GPP2 RAT to which the wireless device 20-1 should handover to).

A target 3GPP/3GPP2 RAT and a target cell for the handover. This may indicate both the RAT and the cell that the wireless device 20-1 should handover to. The target cell could be indicated as, e.g., a GSM Cell Global Identity (CGI) (including Mobile Country Code (MCC), Mobile Network Code (MNC), Location Area Code (LAC), and Cell Identity (CI)) or any other RAT specific cell identifier like, e.g., the 28-bit Universal Terrestrial Radio Access Network (UTRAN) Cell Identifier (UC-Id) including both Radio Network Controller Identifier (RNC-ID) and Cell-ID (C-Id). Notably, the UC-Id is 28 bits and parts of the UC-Id are used for the RNC-ID (e.g., 12 bits) and the rest for the C-Id (e.g., 16 bits). Then, the whole UC-Id can identify a cell within a PLMN, and the C-Id can be used to identify a cell within a Radio Network Subsystem (RNS).

Assistance information for assisting the wireless device 20-1 when performing the handover to a target cell in a target RAT. For example, the assistance information may include at least some SI elements that the wireless device 20-1 would need to first read on the target cell. The wireless device 20-1 may be able to more quickly access the target cell when such assistance information is already provided to the wireless device 20-1 from the WLAN 14.

A 3GPP handover command as defined in the 3GPP specification for a target RAT. For example, if the target RAT is GSM, then the handover command is defined in 3GPP Technical Specification (TS) 44.018 (e.g., version 12.2.0). The same applies for UTRAN and Evolved UTRAN (E-UTRAN), where the handover command is defined in 3GPP TS 25.331 (e.g., version 12.1.0) and 36.331 (e.g., version 12.1.0), respectively. In this case, the WLAN 14 is integrated into the cellular network in such a way that it is possible to perform handover preparation phase signaling towards the RAN node controlling/handling the target RAT and the target cell. The handover command is created by the target RAN node (e.g., the base station 16-1) and provided to the WLAN access node 18 for transmission to the wireless device 20-1.

One or more 3GPP NAS parameters (e.g. attachment type, APN, etc.).

A retry timer that indicates an amount of time that the wireless device 20-1 should attempt to access the target RAT/cell in any of the cases described above. If the wireless device 20-1 is unable to access the target RAN/cell in the amount of time indicated by the retry timer, in some embodiments, the wireless device 20-1 should try to abandon the access attempts to the target RAT/cell and attempt to inform the WLAN 14 (e.g., the WLAN access node 18) of a handover failure.

Figure 4:
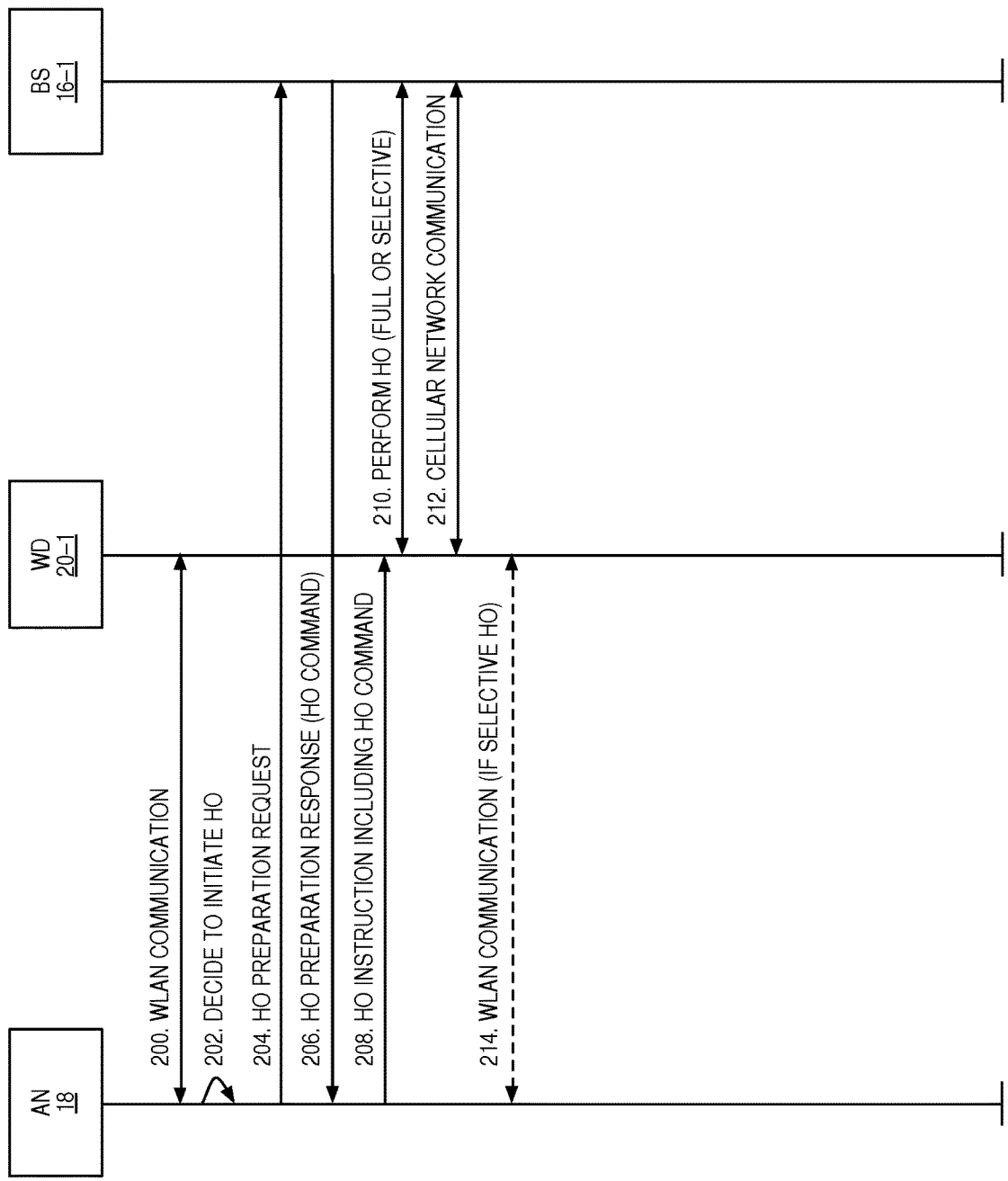
FIG. 4 illustrates the operation of the communication system of FIG. 1 to perform a network-instructed handover of the wireless device from the WLAN to the cellular network according to another embodiment of the present disclosure.

As discussed above, in one embodiment, the handover instruction transmitted by the WLAN access node 18 to the wireless device 20-1 may include a 3GPP handover command. In this regard, FIG. 4 illustrates the operation of the communication system 10 of FIG. 1 according to one embodiment in which the handover instruction includes a 3GPP handover command. As illustrated, initially, communication is established between the wireless device 20-1 and the WLAN 14 via the WLAN access node 18 (step 200). In this embodiment, at some point, the WLAN access node 18 decides, or determines, that a handover of the wireless device 20-1 from the WLAN 14 to the cellular RAN 12 is desired (step 202). In one embodiment, the decision is for a full handover. However, in another embodiment, the WLAN access node 18 may decide to initiate a full or selective handover. The WLAN access node 18 then sends a handover preparation request to the base station 16-1 serving a target cell for the handover (step 204). In response, the base station 16-1 sends a handover preparation response including a 3GPP handover command to the WLAN access node 18 (step 206). Note that while the 3GPP handover command is used in this example, one or more parameters that are normally included in a 3GPP handover command may be used instead of a full 3GPP handover command. The communication between the WLAN access node 18 and the base station 16-1 in steps 202 and 204 may be directly between the base station 16-1 and the WLAN access node 18 via a wired or wireless connection, e.g., a cellular connection, or indirectly through, e.g., a common core network of the cellular RAN 12 and the WLAN 14.

Next, the WLAN access node 18 transmits a handover instruction including the 3GPP handover command to the wireless device 20-1 (step 208). As discussed above, in one embodiment, the 3GPP handover command is transmitted in an IEEE 802.11 Deauthentication/Disassociation Management frame. However, the handover command may be transmitted in other types of IEEE 802.11 frames. In this embodiment, the handover instruction may include, e.g., a 3GPP RAT type for the handover, a 3GPP RAT Identifier (ID) for the handover, and one or more attach parameters taking the form of a 3GPP handover command or one or more parameters that are normally included in a 3GPP handover command. Additionally, the handover instruction may include one or more 3GPP NAS parameters to be used in the Attach Request as defined in Section 5.3.2.1 of 3GPP TS 23.401 (version 12.4.0). These parameters include, for example, APN, attach type per APN (initial attach, handover attach, handover attach with IP Flow Mobility (IFOM), etc.), TFT, etc.

In response to the handover instruction including the 3GPP handover command, the wireless device 20-1 performs the handover to, in this example, a cell served by the base station 16-1 in the cellular RAN 12 (step 210). Once the handover is complete, the wireless device 20-1 communicates with the base station 16-1 (step 212). In addition, if the handover was a selective handover, the wireless device 20-1 also communicates with the WLAN access node 18 for any communications session(s) or traffic that was not handed over (step 214).

Figure 5:
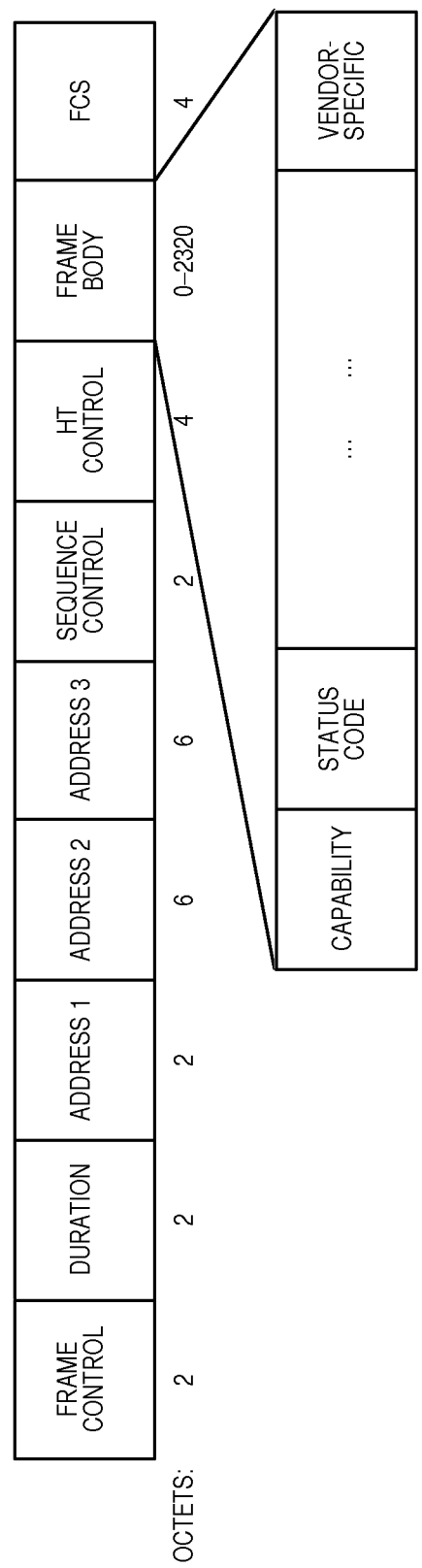
FIG. 5 illustrates a frame structure of an IEEE 802.11 Association Response Management frame that is utilized to transmit a handover instruction from a WLAN access node to the wireless device according to another embodiment of the present disclosure.

As discussed above, the handover instruction may be transmitted in various types of IEEE 802.11 frames. In this regard, FIGS. 5, 6A through 6C, 7A, 7B, and 8-10 illustrate various IEEE 802.11 frame formats that can be utilized to transmit the handover instruction from the WLAN access node 18 to the wireless device 20-1 according to additional embodiments of the present disclosure. More specifically, FIG. 5 illustrates a frame format of an IEEE 802.11 Association Response Management frame as defined in Chapter 8.3.3.6 of the IEEE 802.11-2012 specification. As illustrated, the frame body of the Association Response Management frame includes, among other elements, a status code element and one or more vendor-specific elements. In one embodiment, the handover instruction includes a special status code transmitted in the frame body, where the special status code is a new status code defined for a handover instruction from the WLAN 14. Thus, in this embodiment, the WLAN access node 18 transmits the handover instruction by transmitting an Association Response Management frame including the new, or special, status code defined to indicate a handover instruction.

In addition, in some embodiments, the handover instruction includes additional information transmitted in the one or more vendor-specific elements of the Association Response Management frame. This additional information may include any information related to the handover of the wireless device 20-1 from the WLAN 14 to, in the example of FIGS. 1 and 2, the cellular RAN 12. This additional information may include, for example, any of the information described above with respect to the Deauthentication/Disassociation Management frame.

Still further, in another embodiment, the handover instruction may use only the one or more vendor-specific elements (i.e., without any special status code). For example, in one particular embodiment, the information transmitted in the one or more vendor-specific elements includes a code indicative of the handover instruction. Additional information related to the handover may also be transmitted in the vendor-specific element(s), as discussed above.

Figure 6A:
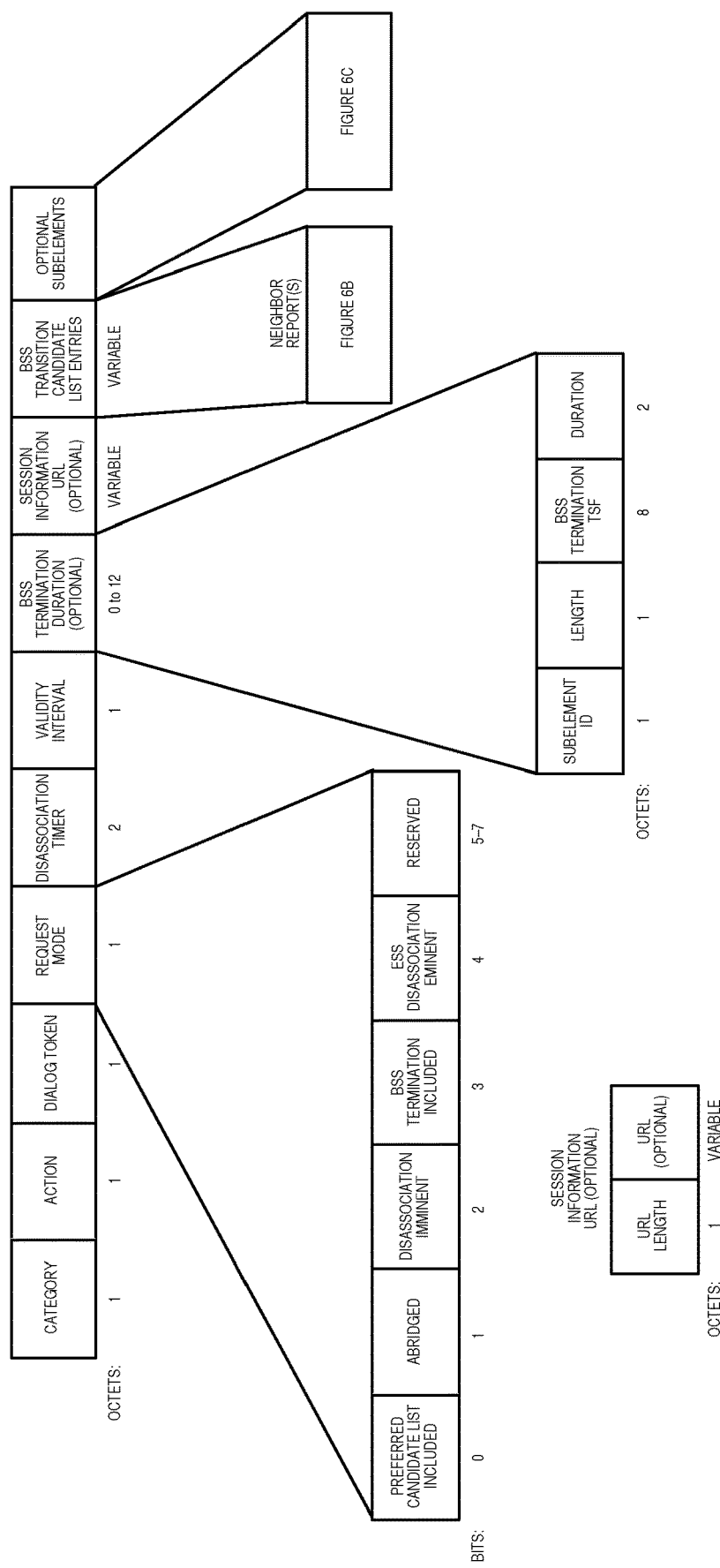
FIGS. 6A through 6C illustrate a frame structure of a conventional IEEE 802.11 Basic Service Set (BSS) Transition Management frame.
Figure 6B:
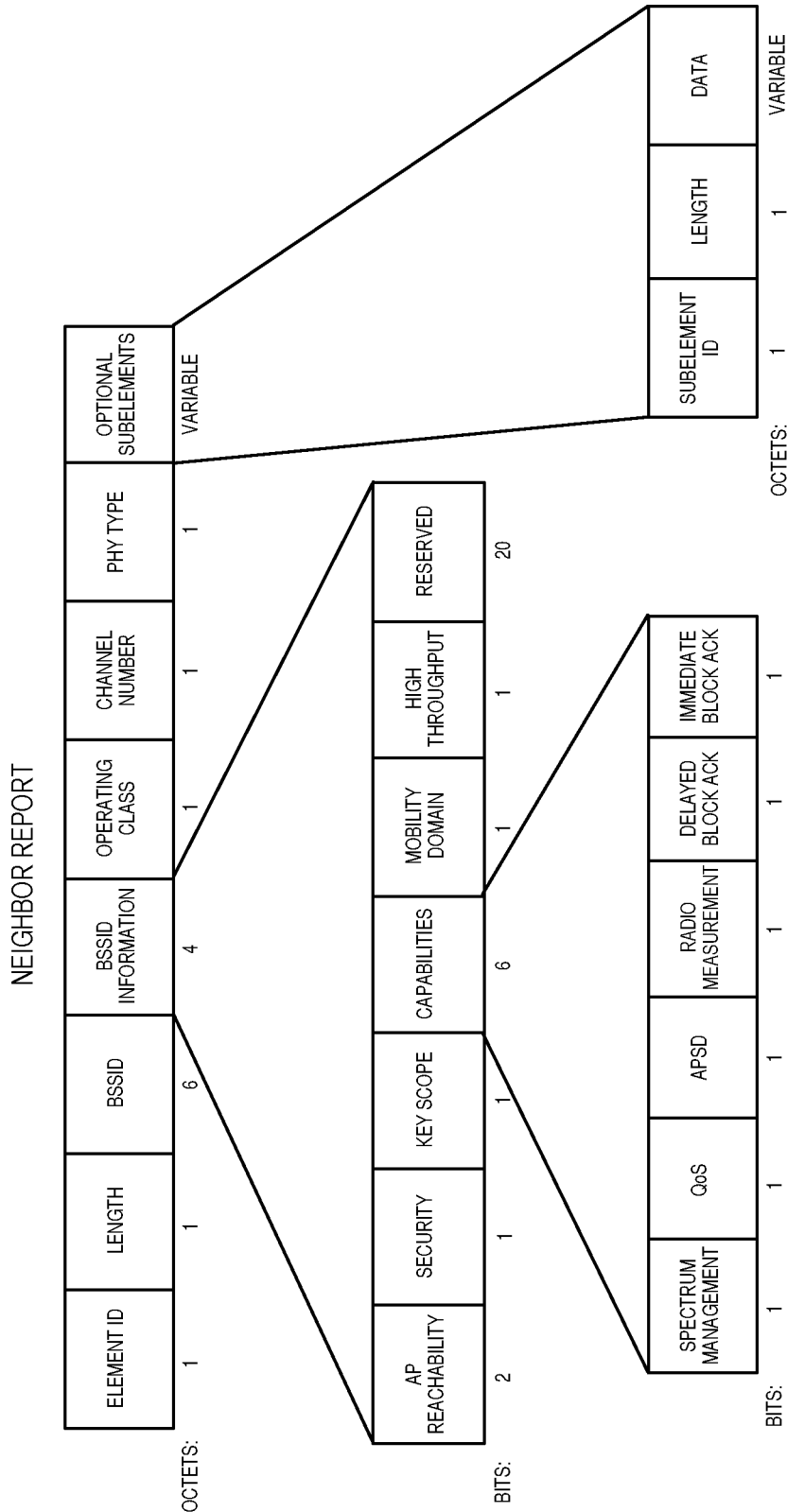
Figure 6C:
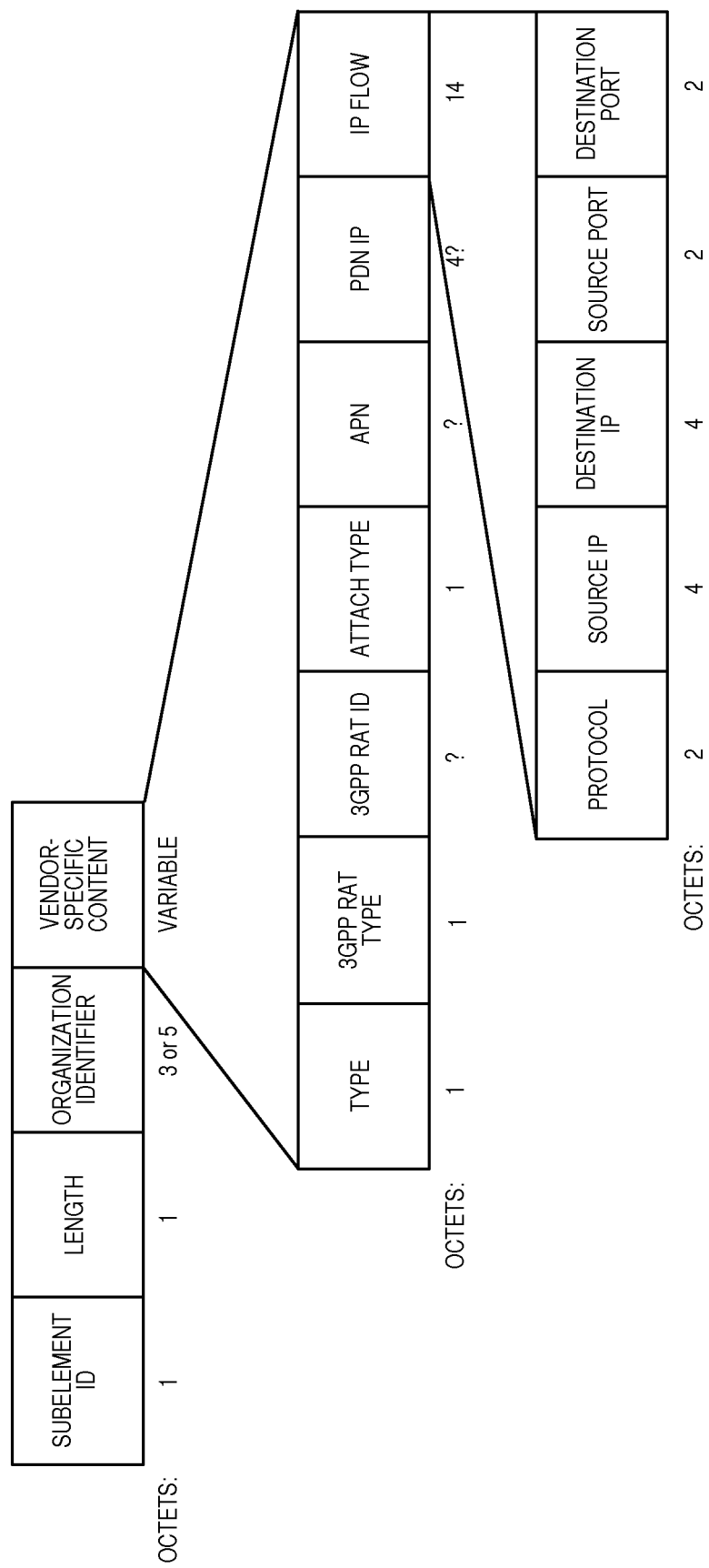
Figure 7A:
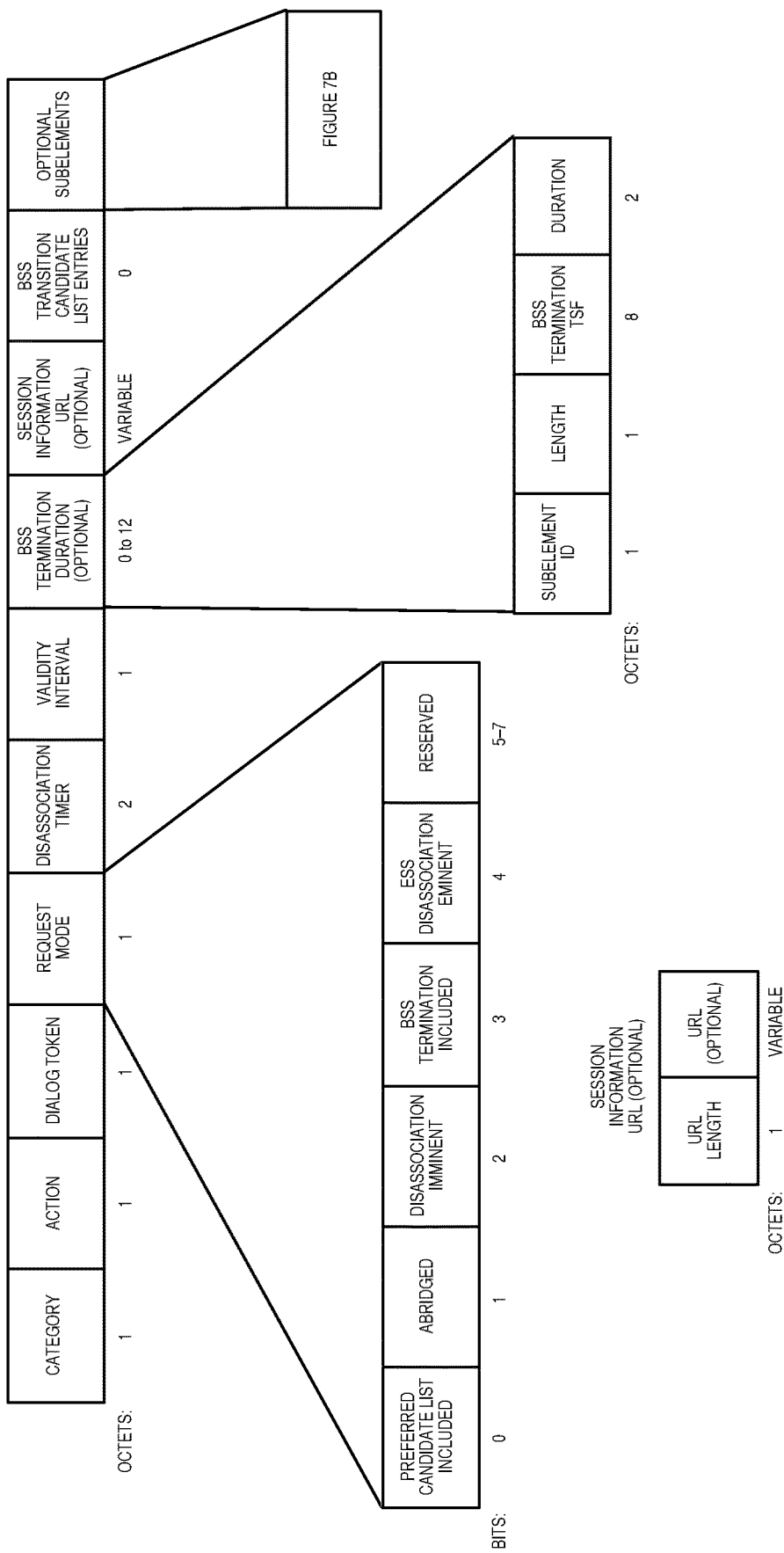
FIGS. 7A and 7B illustrate a frame structure of an IEEE 802.11 BSS Transition Management frame that is utilized to transmit a handover instruction from a WLAN access node to the wireless device according to another embodiment of the present disclosure.
Figure 7B:
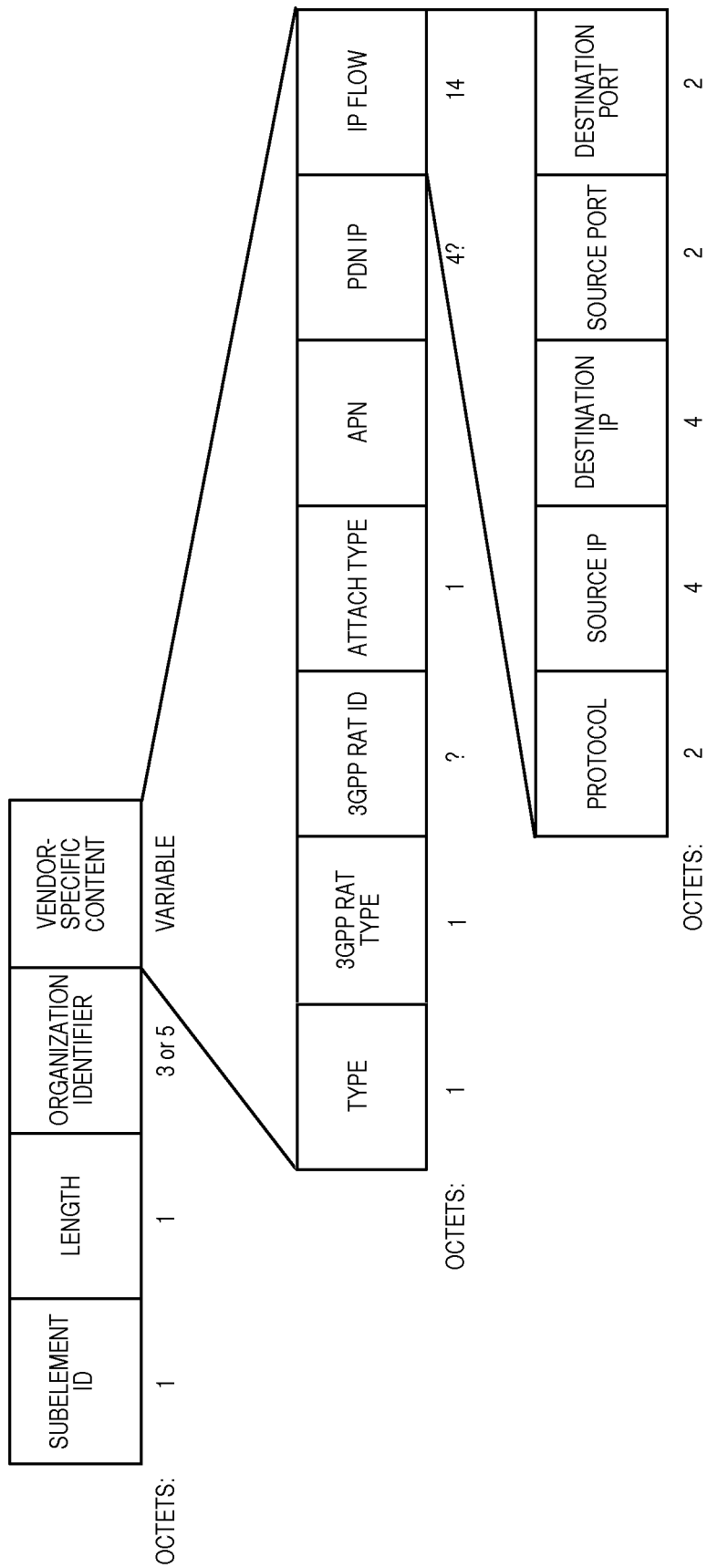

FIGS. 6A through 6C illustrate a frame format of a BSS Transition Management Request frame as defined in Chapter 8.5.14.9 of the IEEE 802.11-2012 specification. Normally, the BSS Transition Management Request frame includes one or more Neighbor Report elements. As illustrated in FIGS. 7A and 7B, in one embodiment, the handover instruction is transmitted from the WLAN access node 18 to the wireless device 20-1 by transmitting a BSS Transition Management Request frame, and specifically a BSS Transition Management Request frame including a BSS Transition Candidate List Entries field, with zero Neighbor Report elements. This frame will then be interpreted by the wireless device 20-1 as a handover instruction. More specifically, zero Neighbor Report elements may be interpreted as there being no suitable WLAN access nodes to which to transition and, as such, a handover to a RAN of a different RAT (e.g., the cellular RAN 12) is needed. Further, in some embodiments, the handover instruction includes additional information related to the handover in the one or more vendor-specific elements. This additional information may include, e.g., any of the additional information described above with respect to the Deauthentication/Disassociation Management frame.

Figure 8:
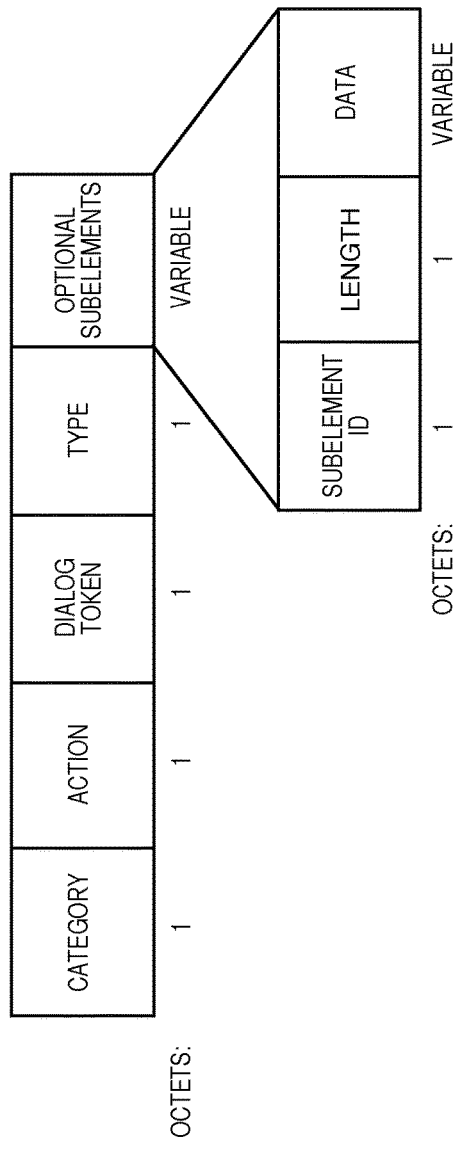
FIG. 8 illustrates a frame structure of an IEEE 802.11 Wireless Network Management Notification (WNM-Notification) Request frame.
Figure 9:
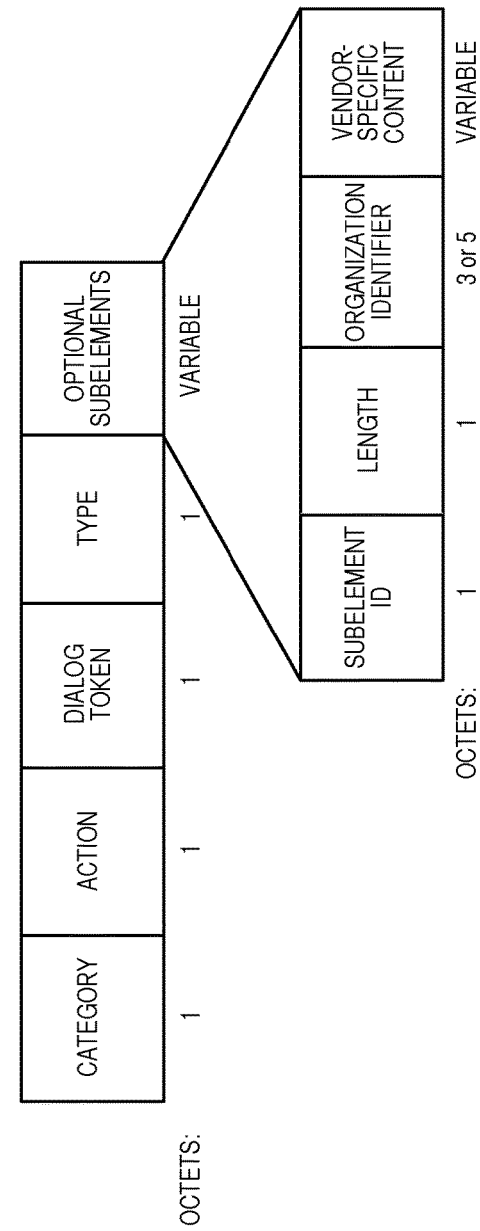
FIG. 9 illustrates a frame structure of an IEEE 802.11 WNM-Notification Request frame with vendor-specific formatting that is utilized to transmit a handover instruction from a WLAN access node to the wireless device according to another embodiment of the present disclosure.

FIG. 8 illustrates a frame format for an IEEE WNM-Notification Request frame as defined Chapter 8.5.14.28 of the IEEE 802.11-2012 specification. Importantly, the WNM-Notification Request frame includes one or more optional subelements in which the handover instruction is transmitted from the WLAN access node 18 to the wireless device 20-1 according to one embodiment of the present disclosure. More specifically, in one embodiment, the optional subelement(s) of the WNM-Notification Request frame are formatted as vendor-specific element(s), as illustrated in FIG. 9. While not essential for the present disclosure, the optional subelement(s) may be formatted as vendor-specific element(s) as defined in Chapter 8.4.2.28 of the IEEE 802.11-2012 specification. The handover instruction can then be transmitted as the vendor-specific content of the optional subelement(s). The handover instruction may include, as described above, a code that indicates a handover instruction and/or information related to the desired handover (e.g., target RAT, target RAN, target cell, 3GPP handover command, 3GPP NAS parameters, retry timer, or the like, or any combination thereof).

Figure 10:
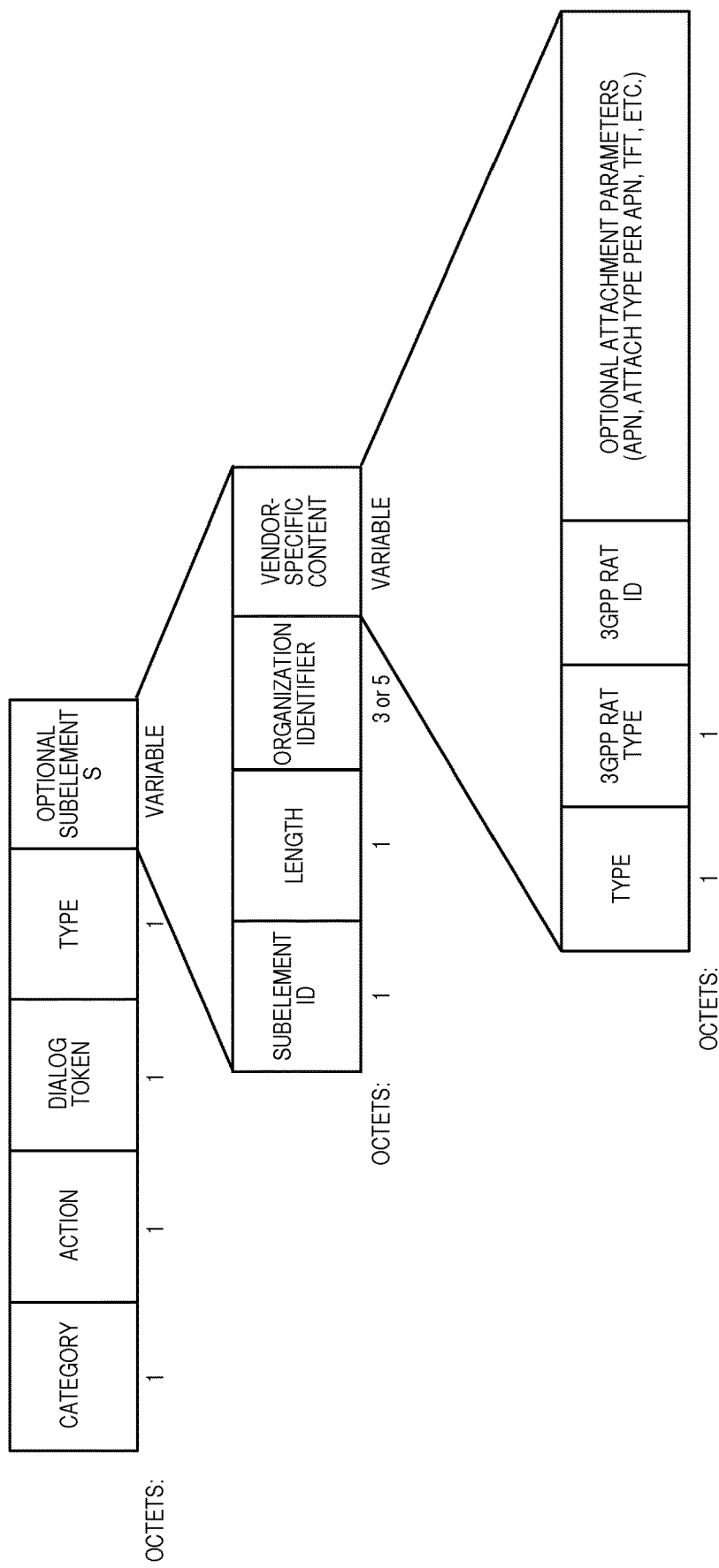
FIG. 10 illustrates a frame structure of an IEEE 802.11 WNM-Notification Request Action frame in which optional subelements are formatted with vendor-specific formatting for transmission of a $3^{rd}$ Generation Partnership Program Project (3GPP) handover command according to one embodiment of the present disclosure.

In one embodiment, the vendor-specific element of the WNM-Notification Request frame is formatted in accordance to the Wi-Fi® Alliance (WFA) rules for such frame types, as illustrated in FIG. 10. In this embodiment, the fields of the WFA formatted vendor-specific element includes the following information:

A subelement ID set to value "221" ("Vendor Specific," as specified by the IEEE 802.11-2012 specification).

An Organization Identifier set to "0x 50 6F 9A" (as requested by the WFA guidelines).

A "Type" set to "0x01" (in conjunction with "WFA Technology Assignments" instructions).

The 3GPP RAT Type indicates a handover preference in regard to a specific RAT to be chosen by the wireless device 20-1 (i.e., a target RAT). In one embodiment, the 3GPP RAT Type field can assume the following values:
0: Reserved
1: Any RAT
2: Global System for Mobile Communications Enhanced Data Rates for Global Evolution Radio Access Network (GERAN)
3: UTRAN
4: E-UTRAN
5-255: Reserved A 3GPP RAT ID specifies an ID of target 3GPP RAN node for the handover (e.g., an ID of the target base station 16).

Still further, in some embodiments, the handover may be either a full or a selective handover. In this regard, the WFA formatted vendor-specific element may optionally include one or more attachment parameters indicating a subset of ongoing traffic or communications sessions (e.g., IP sessions) that are to be handed over. Examples of such attachment parameters include, but are not limited to, APN(s) to be handed over, attach type per APN (initial attach, handover attach, handover attach with IFOM, etc.), TFTs indicating n-tuples to be handed over, or the like, or any combination thereof. Notably, an APN identifies a PDN that the wireless device 20-1 communicates with via the WLAN 14 such as, for example, the Internet, an IP Multimedia System (IMS) network, an enterprise network, or the like. Note that the information discussed above may be transmitted in other types of IEEE 802.11 frames (e.g., a Deauthentication Management frame, a Disassociation Management frame, an Association Request Management frame, a BSS Transition Management Request Action frame, or the like). Similarly, the information discussed above with respect to the WFA formatted WNM-Notification Request frame of FIG. 10 is only one example of the information included in a handover instruction. Additional or alternative information may be included in the handover instruction.

Figure 11A:
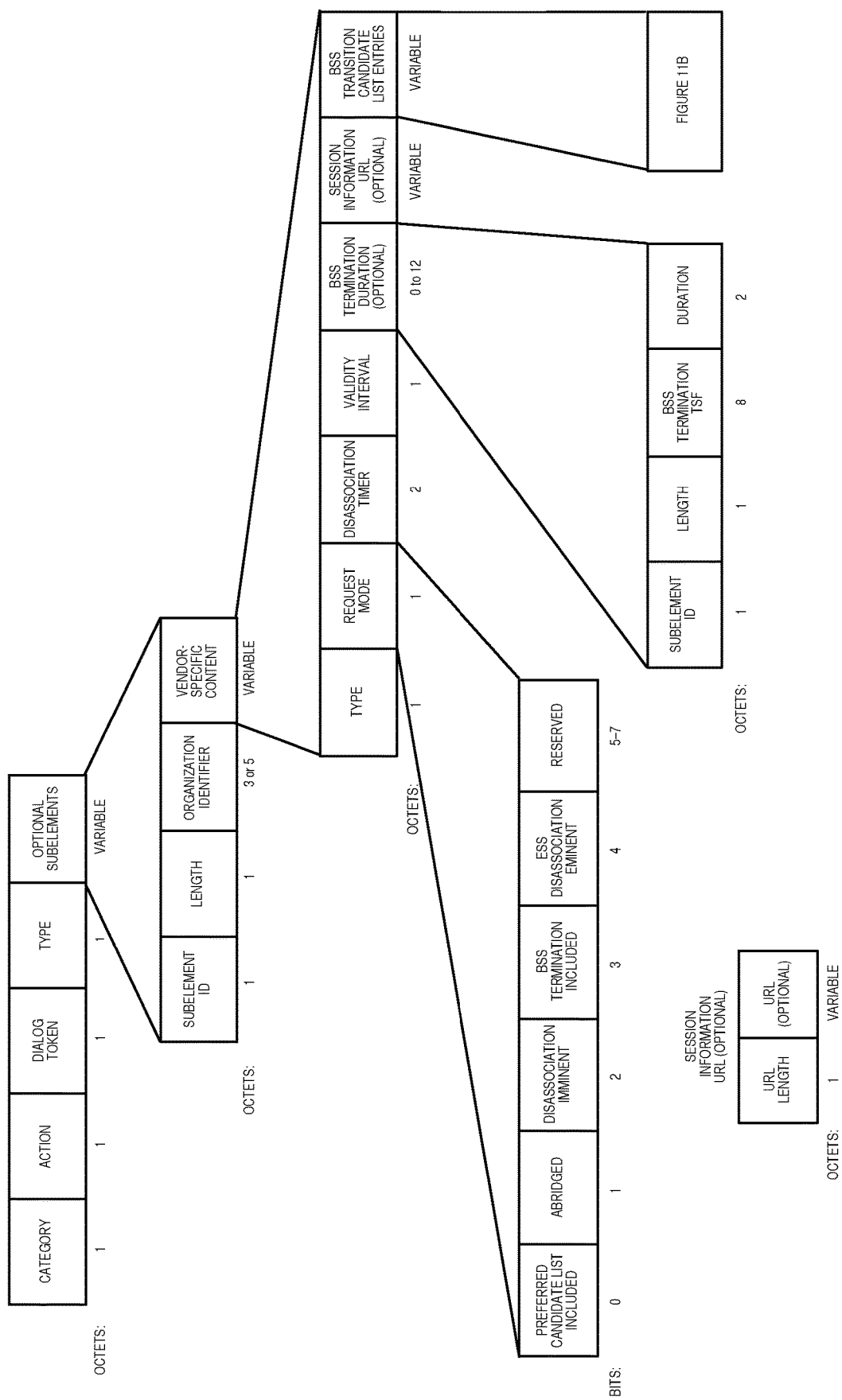
FIGS. 11A and 11B illustrate a frame structure of an IEEE 802.11 WNM-Notification Request frame that is utilized to transmit a handover instruction for multi-band steering according to another embodiment of the present disclosure.
Figure 11B:
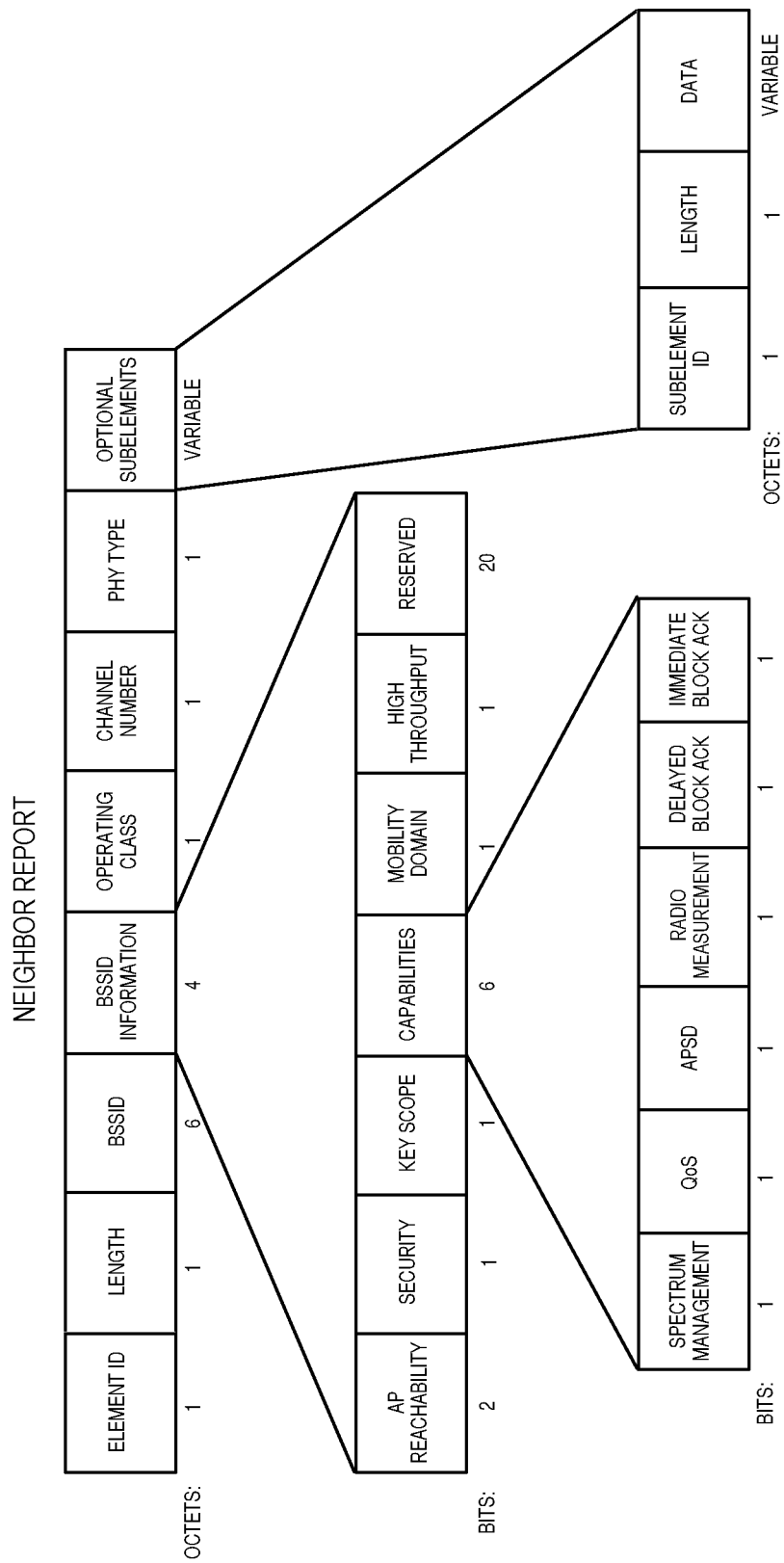

The embodiments described above focus on steering wireless devices 20 from the WLAN 14 to the cellular RAN 12 (or at least from the WLAN 14 to a RAN of a different RAT). FIGS. 11A and 11B illustrate a modified IEEE 802.11 WNM-Notification Request frame that can be utilized for multi-band steering according to one embodiment of the present disclosure. More specifically, the WLAN 14 may include multiple WLAN access nodes 18 operating in different frequency bands (e.g., the 2.4 and 5 Gigahertz (GHz) frequency bands) or a single WLAN access node 18 that operates at two or more frequency bands. Multi-band steering is steering wireless devices 20 from one WLAN frequency band to another WLAN frequency band. The WNM-Notification Request frame of FIGS. 11A and 11B includes BSS Transition Management capabilities. Using the BSS Transition Management capabilities, the WNM-Notification Request frame can be transmitted by the WLAN 18 to, e.g., the wireless device 20-2 to steer the wireless device 20-2 from one frequency band of the WLAN 14 to another frequency band of the WLAN 14.

Particular implementations of the embodiments described herein introduce a mechanism by which a WLAN access node can steer a wireless device to another RAT. Some implementations of the embodiments described above are rather simple and can be implemented with a minimum of effort by both network and wireless device vendors. Also, some implementations of the embodiments described herein utilize elements of standardized solutions and thus can be implemented without an excessive amount of substantial changes to, e.g., the IEEE 802.11-2012 specifications.

Some implementations of the embodiments described above introduce a full-fledged solution that can enable a WLAN access node to communicate an all-traffic, or full, handover of all traffic or a selective handover of only certain type(s) of traffic (i.e., the WLAN access node can communicate a handover at a desired level of granularity). Furthermore, some implementations of the embodiments described herein provide the WLAN access node with the ability to specify a target 3GPP RAT for a handover. Still other embodiments provide enhanced WLAN multiband steering that can be communicated with the same type of frame as a handover instruction, requiring less implementation efforts.

Figure 12:
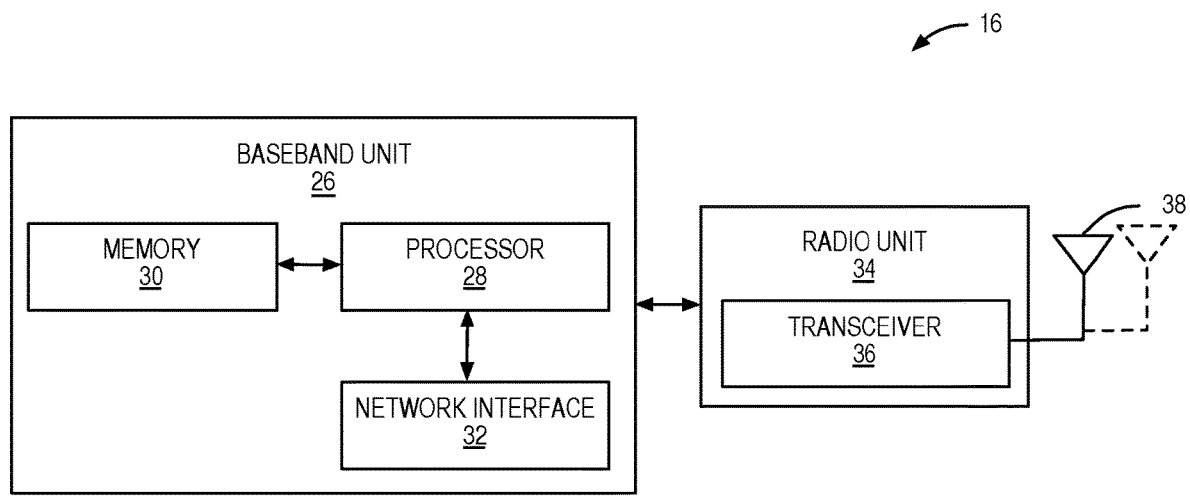
FIG. 12 is a block diagram of one of the base stations of the cellular network of FIG. 1 according to one embodiment of the present disclosure.

While the base stations 16 (or any type of as cellular access nodes) may be implemented in hardware or any combination of hardware and/or software, FIG. 12 is a block diagram of one of the base stations 16 of FIG. 1 according to one embodiment of the present disclosure. Note that while the base stations 16 are discussed herein, the functionality of the base stations 16 described herein can be performed by any type of cellular access node (e.g., a RAN node, a base station, an enhanced Node B (eNodeB), a Radio Network Controller (RNC), or the like). As illustrated, the base station 16 includes a baseband unit 26 including a processor 28, memory 30, and a network interface 32 and a radio unit 34 including a transceiver 36 coupled to one or more antennas 38. In one embodiment, the functionality of the base station 16 described herein is implemented in software stored in the memory 30 and executed by the processor 28. Additionally, the base station 16 may include additional components responsible for providing additional functionality, including any of the functionality described above and/or any functionality necessary to support the embodiments described herein.

In one embodiment, a computer program is provided that includes instructions which, when executed on at least one processor, cause the at least one processor to carry out any of the embodiments of the base station 16 described above. In one embodiment, a carrier containing the computer program is provided, wherein the carrier is one of an electronic signal, an optical signal, a radio signal, or a computer readable storage medium (e.g., a non-transitory computer readable medium).

Figure 13:
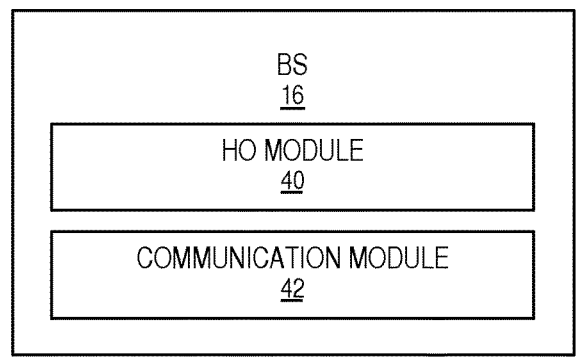
FIG. 13 is a functional block diagram of one of the base stations of the cellular network of FIG. 1 according to one embodiment of the present disclosure.

FIG. 13 is a functional block diagram of one of the base stations 16 of FIG. 1 according to one embodiment of the present disclosure. As illustrated, the base station 16 includes a handover module 40 and a communication module 42, both of which are implemented in software executed by one or more processors (e.g., the processor 28 of FIG. 12). The handover module 40 operates along with, e.g., the wireless device 20-1 to perform the handover of the wireless device 20-1 to a cell served by the base station 16. In addition, in some embodiments, the handover module 40 handles handover preparation requests received from the WLAN access node 18 and builds a 3GPP Handover command message that is sent directly or indirectly to the WLAN access node 18 as part of a handover preparation response. The communication module 42 provides communication with the wireless device 20-1 once the wireless device 20-1 is handed over to the cell served by the base station 16.

Figure 14:
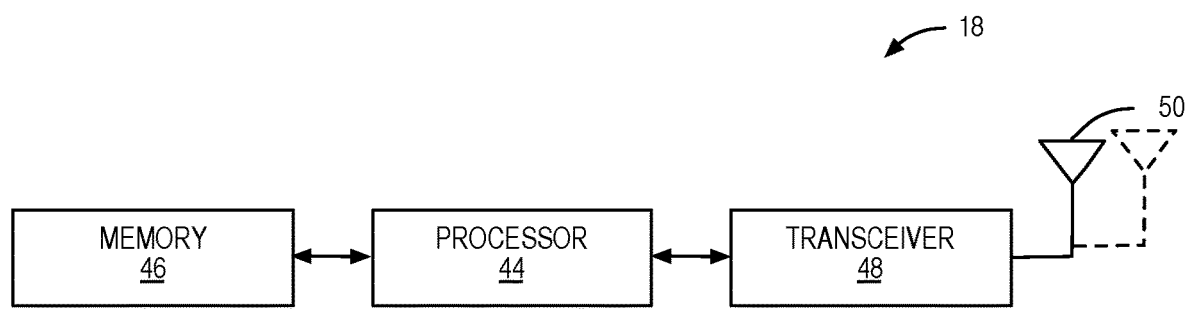
FIG. 14 is a block diagram of the WLAN access node of FIG. 1 according to one embodiment of the present disclosure.

While the WLAN access node 18 may be implemented in any type of hardware or any combination of hardware and software, FIG. 14 is a block diagram of the WLAN access node 18 of FIG. 1 according to one embodiment of the present disclosure. As illustrated, the WLAN access node 18 includes a processor 44, memory 46, and a transceiver 48 coupled to one or more antennas 50. In particular embodiments, some or all of the functionality described above as being provided by the WLAN access node 18 may be provided by the processor 44 executing instructions stored on a computer-readable medium, such as the memory 46. Alternative embodiments of the WLAN access node 18 may include additional components responsible for providing additional functionality, including any of the functionality identified above and/or any functionality necessary to support the embodiments described above.

In one embodiment, a computer program is provided that includes instructions which, when executed on at least one processor, cause the at least one processor to carry out any of the embodiments of the WLAN access node 18 described above. In one embodiment, a carrier containing the computer program is provided, wherein the carrier is one of an electronic signal, an optical signal, a radio signal, or a computer readable storage medium (e.g., a non-transitory computer readable medium).

Figure 15:
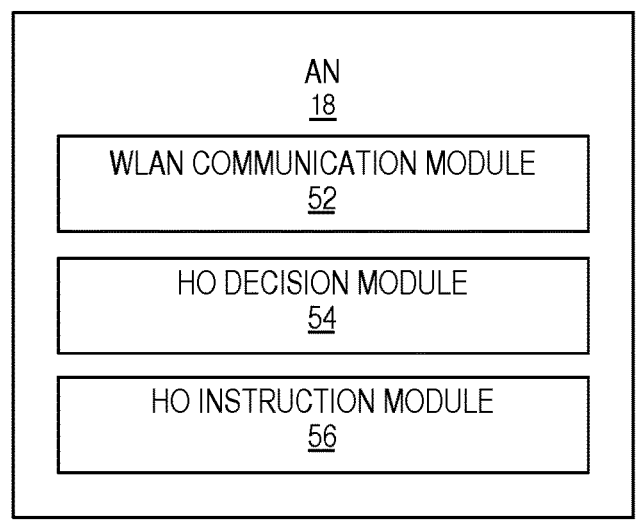
FIG. 15 is a functional block diagram of the WLAN access node of FIG. 1 according to one embodiment of the present disclosure.

FIG. 15 is a functional block diagram of the WLAN access node 18 of FIG. 1 according to one embodiment of the present disclosure. As illustrated, the WLAN access node 18 includes a WLAN communication module 52, a handover decision module 54, and a handover instruction module 56, each of which is implemented in software that is executed by one or more processors of the WLAN access node 18 to provide the functionality described herein. The WLAN communication module 52 provides communication with wireless devices 20 connected to the WLAN 14. The handover decision module 54 decides when a handover of a wireless device 20 from the WLAN 14 to another RAT is to be performed. The handover instruction module 56 provides handover instructions to wireless devices 20 when appropriate. While not illustrated, the WLAN access node 18 may include additional modules such as, for example, a communication module for communication to and/or from the cellular RAN 12 (e.g., to and/or from the base station 16 in the cellular RAN 12, e.g., directly or via a common core network).

Figure 16:
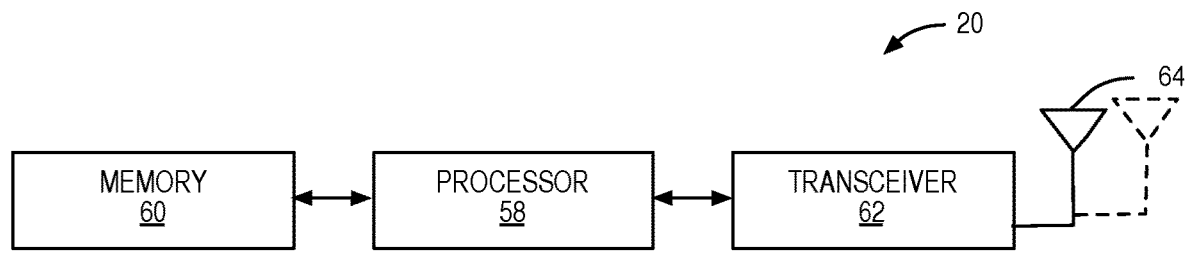
FIG. 16 is a block diagram of one of the wireless devices of FIG. 1 according to one embodiment of the present disclosure.

While the wireless devices 20 may be implemented in any type of hardware or any combination of hardware and software, FIG. 16 is a block diagram of one of the wireless devices 20 of FIG. 1 according to one embodiment of the present disclosure. As illustrated, the wireless device 20 includes a processor 58, memory 60, and a transceiver 62 coupled to one or more antennas 64. In particular embodiments, some or all of the functionality described above as being provided by the wireless device 20 may be provided by the processor 58 executing instructions stored on a computer-readable medium, such as the memory 60. Alternative embodiments of the wireless device 20 may include additional components responsible for providing additional functionality, including any of the functionality identified above and/or any functionality necessary to support the embodiments described above.

In one embodiment, a computer program is provided that includes instructions which, when executed on at least one processor, cause the at least one processor to carry out any of the embodiments of the wireless device 20 described above. In one embodiment, a carrier containing the computer program is provided, wherein the carrier is one of an electronic signal, an optical signal, a radio signal, or a computer readable storage medium (e.g., a non-transitory computer readable medium).

Figure 17:
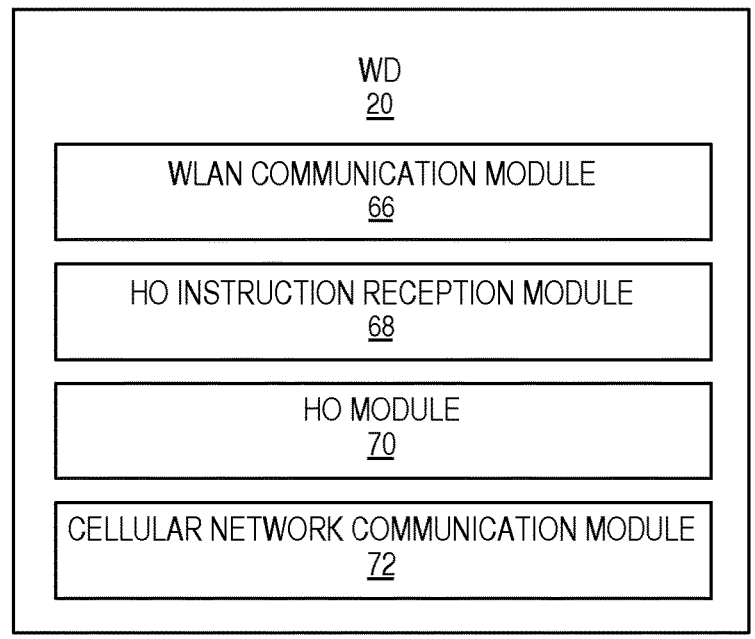
FIG. 17 is a functional block diagram of one of the wireless devices of FIG. 1 according to one embodiment of the present disclosure.

FIG. 17 is a functional block diagram of one of the wireless devices 20 of FIG. 1 according to one embodiment of the present disclosure. As illustrated, the wireless device 20 includes a WLAN communication module 66, a handover instruction reception module 68, a handover module 70, and a cellular network communication module 72, each of which is implemented in software that is executed by one or more processors of the wireless device 20 to provide the functionality described herein. The WLAN communication module 66 provides communication with the WLAN access node 18 of the WLAN 14. The handover instruction reception module 68 operates to receive a handover instruction from the WLAN access node 18. The handover module 70 operates to perform a handover form the WLAN 14 to another RAT, e.g., the 3GPP RAT of the cellular RAN 12, when a handover instruction is received by the handover instruction reception module 68. The cellular network communication module 72 provides communication with the cellular RAN 12.

The following acronyms are used throughout this disclosure.

3GPP 3$^{rd}$ Generation Partnership Project
3GPP2 3$^{rd}$ Generation Partnership Project 2
APN Access Point Name
BSS Basic Service Set
CGI Cell Global Identity CI Cell Identity
C-Id Cell Identifier
eNodeB Evolved Universal Terrestrial Radio Access Network NodeB
EPC Evolved Packet Core
E-UTRAN Evolved Universal Terrestrial Radio Access Network
GERAN Global System for Mobile Communications Enhanced Data Rates for Global Evolution Radio Access Network
GHz Gigahertz
GSM Global System for Mobile Communications
HO Handover
ID Identifier
IEEE Institute for Electrical and Electronics Engineers
IFOM Internet Protocol Flow Mobility
IMS Internet Protocol Multimedia System
IP Internet Protocol
LAC Location Area Code
LTE Long Term Evolution
M2M Machine-to-Machine
MAC Media Access Control
MCC Mobile Country Code
MNC Mobile Network Code
MTC Machine Type Communication
NAS Non-Access Stratum
NID Network Identifier
PDN Packet Data Network
PHY PHYsical Layer
PLMN Public Land Mobile Network
RAN Radio Access Network
RAT Radio Access Technology
RFID Radio Frequency Identifier
RNC Radio Network Controller
RNC-ID Radio Network Controller Identifier
RNS Radio Network Subsystem
RSSI Received Signal Strength Indicator
SI System Information
SID System Identifier
STA Station
TFT Traffic Flow Template
TS Technical Specification
UC-Id Universal Terrestrial Radio Access Network Cell Identifier
UE User Equipment
UMTS Universal Mobile Telecommunications System
UTRAN Universal Terrestrial Radio Access Network
WCDMA Wideband Code Division Multiple Access
WFA Wi-Fi® Alliance
WLAN Wireless Local Area Network
WNM-Notification Wireless Network Management Notification Those skilled in the art will recognize improvements and modifications to the embodiments of the present disclosure. All such improvements and modifications are considered within the scope of the concepts disclosed herein and the claims that follow.

What is claimed is:

1. A method of operation of a Wireless Local Access Network, WLAN, node, the method comprising:
determining that a handover of a wireless device from a WLAN to another radio access network of a different radio access technology is to be performed; and
instructing the wireless device to perform the handover from the WLAN to the radio access network of the different radio access technology, wherein instructing the wireless device to perform the handover comprises sending information that indicates whether the handover is a full handover of all communication sessions or a selective handover of one or more but less than all communication sessions, and wherein the WLAN node can perform both the full handover and the selective handover.

2. The method of claim 1 wherein instructing the wireless device to perform the handover comprises sending at least one of:
information that identifies the different radio access technology for the handover;
information that identifies a target set of networks for the handover;
information that identifies the radio access network of the different radio access technology;
information that identifies a target cell in the radio access network of the different radio access technology;
assistance information that assists the wireless device when performing the handover;
a Third Generation Partnership Project, 3GPP, handover command; and/or
a Non-Access Stratum, NAS, parameter.

3. The method of claim 1 wherein instructing the wireless device to perform the handover comprises sending a retry timer value that defines an amount of time that the wireless device should attempt to access the radio access network of the different radio access technology when performing the handover.

4. The method of claim 1 wherein the WLAN is an IEEE 802.11 wireless network.

5. The method of claim 4 wherein the different radio access technology is a cellular network radio access technology.

6. The method of claim 5 wherein the cellular network radio access technology is a Third Generation Partnership Project, 3GPP, or Third Generation Partnership Project 2, 3GPP2, radio access technology.

7. The method of claim 6 wherein instructing the wireless device to perform the handover comprises sending, to the wireless device, a management frame selected from a group consisting of:
a Basic Service Set, BSS, Transition Management, BTM, frame with zero neighbor report elements;
a BTM frame with zero neighbor report elements and with information regarding the handover instruction in one or more vendor-specific elements within the BTM frame;
a Deauthentication Management frame comprising a reason code that corresponds to the handover instruction;
a Disassociation Management frame comprising a reason code that corresponds to the handover instruction;
an Association Response Management frame comprising the handover instruction from the WLAN node; and
a Wireless Network Management Notification, WNM-Notification, Request frame comprising the handover instruction within one or more optional subelements formatted as one or more vendor-specific elements.

8. The method of claim 7 wherein sending the management frame further comprises sending information regarding the handover instruction in one or more vendor-specific elements within the management frame.

9. The method of claim 1 wherein:
determining that the handover of the wireless device from the WLAN to the radio access network of the different radio access technology is to be performed comprises:
deciding to initiate a handover to a Third Generation Partnership Project, 3GPP, radio access technology;

sending a handover preparation request to a radio access node in a radio access network of the 3GPP radio access technology; and receiving a handover preparation response from the radio access node comprising a 3GPP handover command; and instructing the wireless device to perform the handover comprises sending the 3GPP handover command to the wireless device.

10. A Wireless Local Access Network, WLAN, node comprising:

a processor; and memory containing instructions executable by the processor whereby the WLAN node is operative to:

determine that a handover of a wireless device from a WLAN to another radio access network of a different radio access technology is to be performed; and send information that indicates whether the handover is a full handover of all communication sessions or a selective handover of one or more but less than all communication sessions to thereby instruct the wireless device to perform the handover from the WLAN to the radio access network of the different radio access technology, wherein the WLAN node can perform both the full handover and the selective handover.

11. A method of operation of a wireless device, comprising:

communicating with a Wireless Local Access Network, WLAN, node;

receiving an instruction from the WLAN node to perform a handover from a WLAN to another radio access network of a different radio access technology, wherein receiving the instruction to perform the handover comprises receiving information that indicates whether the handover is a full handover of all communication sessions or a selective handover of one or more but less than all communication sessions, and wherein the WLAN node can perform both full handovers and selective handovers; and performing the handover in response to receiving the instruction.

12. The method of claim 11 wherein receiving the instruction to perform the handover comprises:

receiving at least one of:

information that identifies the different radio access technology for the handover;

information that identifies a target set of networks for the handover;

information that identifies the radio access network of the different radio access technology;

information that identifies a target cell in the radio access network of the different radio access technology;

assistance information that assists the wireless device when performing the handover;

a Third Generation Partnership Project, 3GPP, handover command; and/or a Non-Access Stratum, NAS, parameter; and performing the handover comprises performing the handover to the radio access network of the different radio access technology identified by the information included in the handover instruction.

13. The method of claim 11 wherein receiving the instruction to perform the handover comprises receiving a retry timer value that defines an amount of time that the wireless device should attempt to access the radio access network of the different radio access technology when performing the handover.

14. The method of claim 11 wherein the WLAN is an IEEE 802.11 wireless network.

15. The method of claim 14 wherein the different radio access technology is a cellular network radio access technology.

16. The method of claim 15 wherein the cellular network radio access technology is a Third Generation Partnership Project, 3GPP, or Third Generation Partnership Project 2, 3GPP2, radio access technology.

17. The method of claim 16 wherein receiving the instruction to perform the handover comprises receiving a management frame transmitted by the WLAN node, the management frame selected from a group consisting of:

a Basic Service Set, BSS, Transition Management, BTM, frame with zero neighbor report elements;

a BTM frame with zero neighbor report elements and with information regarding the handover instruction in one or more vendor-specific elements within the BTM frame;

a Deauthentication Management frame comprising a reason code that corresponds to the handover instruction;

a Disassociation Management frame comprising a reason code that corresponds to the handover instruction;

an Association Response Management frame comprising the handover instruction from the WLAN node; and a Wireless Network Management Notification, WNM-Notification, Request frame comprising the handover instruction within one or more optional subelements formatted as one or more vendor-specific elements.

* * * * *